United States Patent
Yoneda et al.

(10) Patent No.: US 8,573,485 B2
(45) Date of Patent: Nov. 5, 2013

(54) INFORMATION PROCESSING APPARATUS AND METHOD AND PROGRAM FOR MEDIATING APPLICATIONS

(75) Inventors: Yoshihiro Yoneda, Kanagawa (JP); Akira Wakatsuki, Tokyo (JP)

(73) Assignee: Sony Corporation, Tokyo (JP)

( * ) Notice: Subject to any disclaimer, the term of this patent is extended or adjusted under 35 U.S.C. 154(b) by 599 days.

(21) Appl. No.: 11/727,725

(22) Filed: Mar. 28, 2007

(65) Prior Publication Data

US 2007/0235537 A1 Oct. 11, 2007

(30) Foreign Application Priority Data

Apr. 5, 2006 (JP) ................................ 2006-104308

(51) Int. Cl.
*G06K 7/00* (2006.01)
(52) U.S. Cl.
USPC ............... 235/380; 235/375; 705/41; 705/44
(58) Field of Classification Search
USPC ............... 235/380, 382, 441, 449, 487, 492; 705/41, 44
See application file for complete search history.

(56) References Cited

U.S. PATENT DOCUMENTS

| 5,671,442 | A  | * | 9/1997 | Feeney et al. ................. 710/14 |
| 6,038,551 | A  | * | 3/2000 | Barlow et al. ................. 705/41 |
| 6,360,952 | B1 | * | 3/2002 | Kimlinger et al. ............ 235/492 |
| 7,871,010 | B2 | * | 1/2011 | Adams et al. ................ 235/492 |
| 2005/0050553 | A1 | | 3/2005 | Hen et al. |

FOREIGN PATENT DOCUMENTS

| EP | 0-259-659 | 3/1988 |
| EP | 0-733-992 | 9/1996 |
| EP | 0 895 205 B1 | 2/1998 |
| EP | 0259659 A2 * | 3/1998 |
| EP | 1-372-084 | 12/2003 |
| GB | 2-345-555 | 7/2000 |
| JP | 06-301623 | 10/1994 |
| JP | 2001-209607 | 8/2001 |
| JP | 2001-290607 | 10/2001 |
| JP | 2002-232439 | 8/2002 |
| JP | 2003-016403 | 1/2003 |
| JP | 2004-046610 | 2/2004 |
| JP | 2004-213059 | 7/2004 |
| JP | 2004-318315 | 11/2004 |
| WO | WO 01/29762 A2 | 4/2001 |

OTHER PUBLICATIONS

Apple Computer, et al., Interoperability Specification for ICCs and Personal Computer Systems, Part 5, Sep. 2005, Revision 2.01.01.*

(Continued)

*Primary Examiner* — Michael G Lee
*Assistant Examiner* — Matthew Mikels
(74) *Attorney, Agent, or Firm* — Rader, Fishman & Grauer PLLC

(57) ABSTRACT

An information processing apparatus is capable of being connected to an IC card via a reader/writer. The information processing apparatus includes a middleware and a device driver provided so as to correspond to the reader/writer. The middleware provides a plurality of applications for the IC card with basic functions shared by the applications. The device driver sequentially processes a plurality of commands received from the plurality of applications via the middleware in the order in which the commands are received so as to control the corresponding reader/writer. In this way, the applications concurrently access the reader/writer.

19 Claims, 14 Drawing Sheets

(56) References Cited

OTHER PUBLICATIONS

Dick Hussemann, Standards in the Smartcard World, Jul. 16, 2001, Computer Networks, vol. 36, Issue 4, pp. 473-487.*

Japanese Office Action dated Apr. 22, 2008 for corresponding Japanese Application No. 2006-104308.
Singapore Examination Report for application No. SG 200702386-4 dated Oct. 8, 2007.
European Search Report Dated Nov. 2, 2007.

* cited by examiner

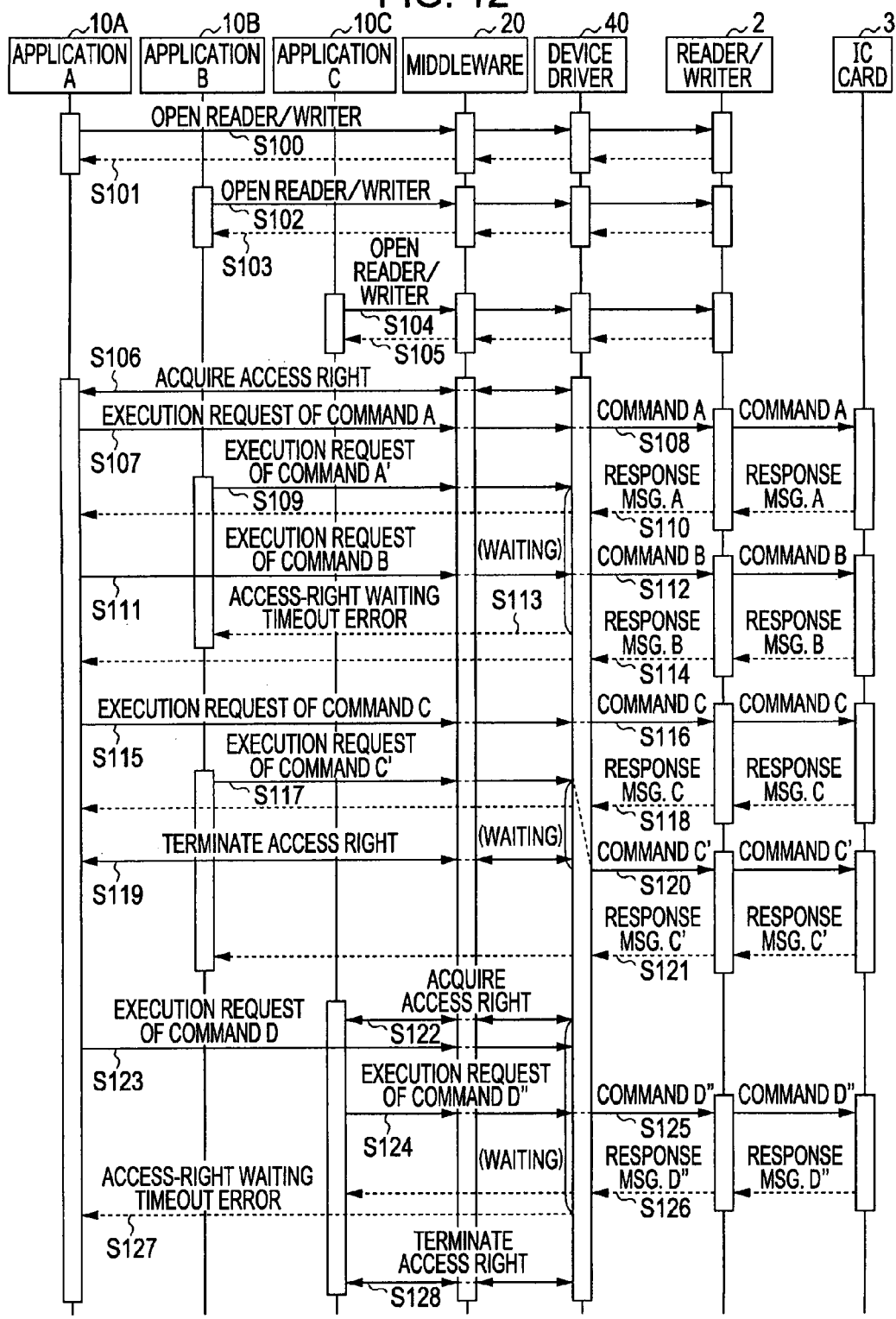

INFORMATION PROCESSING APPARATUS AND METHOD AND PROGRAM FOR MEDIATING APPLICATIONS

BACKGROUND OF THE INVENTION

1. Field of the Invention

The present invention relates to an information processing apparatus and a method and a program for mediating applications.

2. Description of the Related Art

With the widespread use of IC cards, reader/writers for reading and writing information from and to IC cards have been installed in a variety of places. When IC cards were first introduced, they were mainly used in apparatuses for business applications. In recent years, the use of low-cost reader/writers in consumer electronics devices (hereinafter referred to as "CE devices") has become widespread. Accordingly, the number of applications using IC cards has been rapidly increasing.

In particular, the number of CE devices, such as personal computers (PCs) and mobile phones, having the reader/writer function has been rapidly increasing. Therefore, a different reader/writer may be connected to such CE devices having the reader/writer function. This type of CE device can pre-store a plurality of applications for using an IC card and a user can freely install a new application in the CE device. Consequently, the chances have greatly increased that a plurality of applications for IC cards coexist in the same CE device.

SUMMARY OF THE INVENTION

However, an existing IC card application that runs on an information processing apparatus, such as the above-described CE device, has an architecture in which one application exclusively uses one reader/writer. Accordingly, while an application is using a reader/writer, another application cannot use that reader/writer. For example, while an application is displaying the balance of electronic money or purchase history information in the IC card, another application cannot display transit fare payment log information. That is, existing information processing apparatuses that use an IC card do not support a multi-application environment, and therefore, cannot sufficiently mediate a plurality of applications.

Japanese Unexamined Patent Application Publication No. 2003-16403 describes a technology in which an IC card includes a plurality of applications and assigns an access right to each application in the IC card. However, this technology has been developed under assumption that the IC card includes a plurality of applications. Therefore, this technology cannot be applied to an IC card that does not include an application and that only reads and writes data in response to a command sent from a CE device. That is, this technology cannot support the above-described multi-application environment.

Accordingly, the present invention provides an information processing apparatus and a method and a program for appropriately mediating applications for an IC card when a plurality of the applications simultaneously use a reader/writer.

According to an embodiment of the present invention, an information processing apparatus capable of being connected to an IC card via a reader/writer includes a middleware and a device driver provided so as to correspond to the reader/writer. The middleware provides a plurality of applications for the IC card with basic functions shared by the applications. The device driver sequentially processes a plurality of commands received from the plurality of applications via the middleware in the order in which the commands are received so as to control the corresponding reader/writer so that the applications concurrently access the reader/writer.

In such a configuration, each of the applications can request the device driver to execute a command using the basic functions provided by the middleware and shared by the plurality of applications. The device driver can sequentially process a plurality of commands received from the plurality of applications via the middleware in the order in which the commands are received so as to control the reader/writer. Thus, the device driver can transmit the commands to the IC card. Accordingly, the plurality of applications can concurrently use the same reader/writer, and therefore, mediation of the plurality of applications can be appropriately realized.

The device driver can switch between a shared mode in which the plurality of applications are allowed to concurrently access the reader/writer and a dedicated mode in which only one of the applications is allowed to access the reader/writer.

The middleware can provide the applications with an application programming interface used for each of the applications to select one of the shared mode and the dedicated mode, and the device driver can switch between the shared mode and the dedicated mode in accordance with the mode selected for each of the applications.

When the shared mode is set, the device driver can grant an access right for accessing the reader/writer to one of the applications in response to a request received from the one of the applications, and while the access right is granted to the one of the applications, the device driver can execute only commands received from the one of the applications and places commands received from the applications other than the one of the applications in an execution wait mode.

The middleware can provide the one of the applications with an application programming interface used for the one of the applications to request the device driver to grant the access right to the one of the applications.

Upon receiving a command from one of the applications while executing a command received from one of the other applications, the device driver can place the received command in an execution wait mode from the time when the command is received to the time when a predetermined timeout interval has elapsed. When predetermined timeout interval has elapsed, the device driver can send a timeout error message to the one of the applications.

The device driver can set the timeout interval for each of the applications.

The device driver can limit the number of applications concurrently accessible to the reader/writer to a predetermined maximum number of accesses or less.

The device driver can include a communication information storage module for storing information about communication between each of the applications and the reader/writer for each of the applications.

A plurality of the reader/writers can be connected to the information processing apparatus, and the middleware can select one of the reader/writers in accordance with a use request received from each of the applications and request the device driver corresponding to the selected reader/writer to set the selected reader/writer to be usable. The device driver can determine whether the selected reader/writer is accessible from each of the applications in response to the request from the middleware. If the selected reader/writer is accessible, the device driver can set the selected reader/writer to be usable with each of the applications.

The middleware can hold a list of the one or more reader/writers compatible with each of the applications and sequentially selects one of the reader/writers in the list so as to sequentially request the device driver corresponding to the selected reader/writer to set the reader/writer to be usable with each of the applications.

According to another embodiment of the present invention, a method of mediating a plurality of applications for an IC card for use in an information processing apparatus capable of being connected to the IC card via a reader/writer is provided. The method includes the steps of receiving a plurality of commands by a device driver provided so as to correspond to the reader/writer from a middleware, where the middleware provides the plurality of applications with basic functions shared by the applications so that the applications are concurrently accessible to the reader/writer, and sequentially processing the plurality of received commands by the device driver in the order in which the commands are received so as to control the reader/writer.

The device driver can switch between a shared mode in which the plurality of applications are allowed to concurrently access the reader/writer and a dedicated mode in which only one of the applications is allowed to access the reader/writer.

The middleware can provide the applications with an application programming interface used for each of the applications to select one of the shared mode and the dedicated mode, and the device driver can switch between the shared mode and the dedicated mode in accordance with the mode selected for each of the applications.

When the shared mode is set, the device driver can grant an access right for accessing the reader/writer to one of the applications in response to a request received from the one of the applications, and while the access right is granted to the one of the applications, the device driver can execute only commands received from the one of the applications and places commands received from the applications other than the one of the applications in an execution wait mode.

The middleware can provide the one of the applications with an application programming interface used for the one of the applications to request the device driver to grant the access right to the one of the applications.

Upon receiving a command from one of the applications while executing a command received from one of the other applications, the device driver can place the received command in an execution wait mode from the time when the command is received to the time when a predetermined timeout interval has elapsed. When predetermined timeout interval has elapsed, the device driver can send a timeout error message to the one of the applications.

The device driver can set the timeout interval for each of the applications.

The device driver can limit the number of applications concurrently accessible to the reader/writer to a predetermined maximum number of accesses or less.

The device driver can include a communication information storage module for storing information about communication between each of the applications and the reader/writer for each of the applications.

A plurality of the reader/writers can be connected to the information processing apparatus, and the middleware can select one of the reader/writers in accordance with a use request received from each of the applications and request the device driver corresponding to the selected reader/writer to set the selected reader/writer to be usable. The device driver can determine whether the selected reader/writer is accessible from each of the applications in response to the request from the middleware. If the selected reader/writer is accessible, the device driver can set the selected reader/writer to be usable with each of the applications.

The middleware can hold a list of the one or more reader/writers compatible with each of the applications and sequentially selects one of the reader/writers in the list so as to sequentially request the device driver corresponding to the selected reader/writer to set the reader/writer to be usable with each of the applications.

According to still another embodiment of the present invention, a program includes program code for causing a computer to function as an information processing apparatus capable of being connected to an IC card via a reader/writer. The information processing apparatus includes a middleware and a device driver provided so as to correspond to the reader/writer. The middleware provides a plurality of applications for the IC card with basic functions shared by the applications. The device driver sequentially processes a plurality of commands received from the plurality of applications via the middleware in the order in which the commands are received so as to control the corresponding reader/writer so that the applications concurrently access the reader/writer.

As described above, according to the embodiments of the present invention, when a plurality of applications for an IC card simultaneously use a reader/writer, an appropriate mediation among the applications can be realized.

BRIEF DESCRIPTION OF THE DRAWINGS

FIG. 12 is a sequence diagram illustrating a particular example of the command processing of granting the access right in the information processing apparatus according to the first embodiment.

DESCRIPTION OF THE PREFERRED EMBODIMENTS

Figure 1:
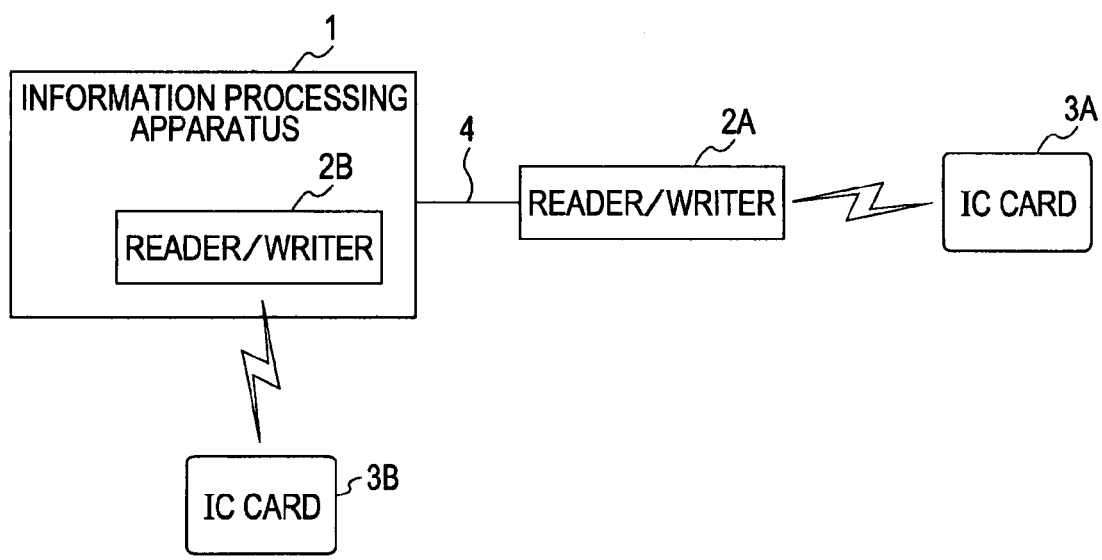
FIG. 1 is a block diagram when an information processing apparatus according to a first embodiment is connected to an IC card via a reader/writer.

Exemplary embodiments of the present invention are described below with reference to the accompanying drawings. Hereinafter, the same reference numerals are used to designate corresponding parts of the various embodiments and the accompanying drawings, and therefore, descriptions are not repeated.

An exemplary configuration of an information processing apparatus that can be connected to a reader/writer according to a first embodiment of the present invention is briefly described with reference to FIG. 1. FIG. 1 is a block diagram of an information processing apparatus 1, an IC card 3, and reader/writers 2 according to the present embodiment when the information processing apparatus 1 is connected to the IC card 3 via the reader/writers 2.

As shown in FIG. 1, the information processing apparatus 1 can be connected to, for example, a plurality of IC cards 3A and 3B (hereinafter sometimes collectively referred to as "IC cards 3") via a plurality of reader/writers 2A and 2B (hereinafter sometimes collectively referred to as "reader/writers 2"). The information processing apparatus 1 can communicate a variety of information with the IC card 3 via the reader/writer 2. The information processing apparatus 1 is composed of, for example, a computing apparatus, such as a personal computer (either a laptop or a desktop), or a CE device, such as a mobile phone. However, the information processing apparatus 1 is not limited to such devices. For example, the information processing apparatus 1 may be a personal digital assistant, a portable video/music player, a home game console, a portable game machine, an information appliance, an electronic dictionary, or commercial equipment.

The reader/writers 2 can communicate a variety of information with the IC card 3, for example, in a contactless manner. The reader/writers 2 can read and write a variety of information from and to the IC card 3 and can perform polling to determine whether the IC card 3 is present in the vicinity.

For example, such reader/writers 2 may be embedded (pre-installed) in the information processing apparatus 1 or may be externally connected to the information processing apparatus 1 via a cable 4, such as a universal serial bus (USB) cable, or via a wireless communication. In addition, a plurality of the reader/writers 2 may be externally connected to the information processing apparatus 1 or may be preinstalled in the information processing apparatus 1. In FIG. 1, the reader/writer 2A is externally connected to the information processing apparatus 1 via the cable 4 whereas the reader/writer 2B is preinstalled in the information processing apparatus 1. In this way, the information processing apparatus 1 can be connected to the two IC cards 3A and 3B (either of the same type or of different types) via the reader/writers 2A and 2B. However, the manner of connection is not limited thereto. For example, the information processing apparatus 1 may be connected to any number of the IC cards 3 via only one of the reader/writers 2 or three or more reader/writers 2.

For example, the IC cards 3 are noncontact IC cards capable of wirelessly and contactlessly communicating with the reader/writers 2 if the distance between the IC cards and the reader/writers 2 is in a short range (e.g., about 0 to about 10 cm). A storage unit in each of the IC cards 3 can store a secured data, such as electronic money information, and log information.

Figure 2:
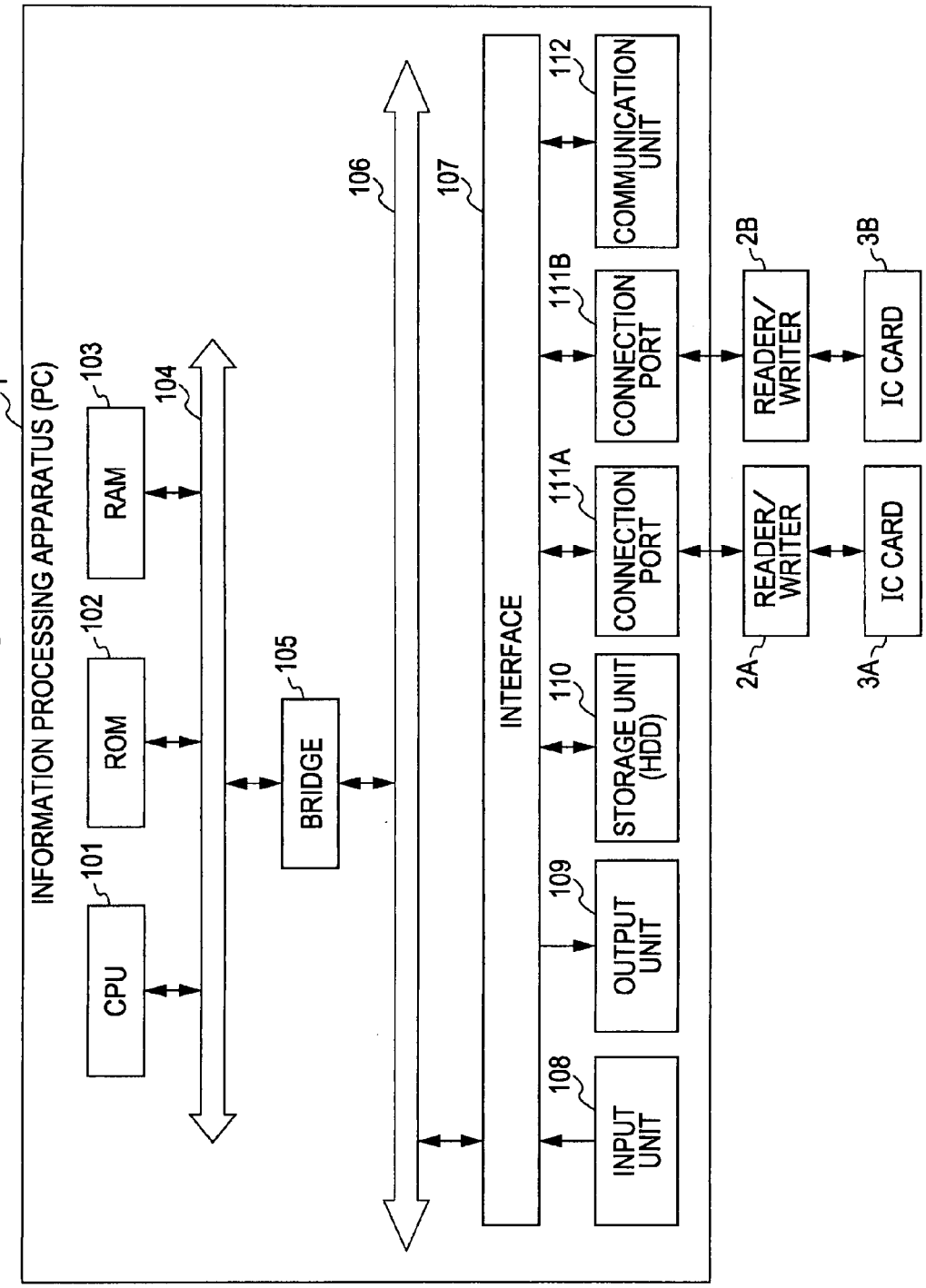
FIG. 2 is a block diagram of an exemplary hardware configuration of the information processing apparatus according to the first embodiment.

An exemplary hardware configuration of the information processing apparatus 1 (e.g., a personal computer (PC)) according to the present embodiment is described next with reference to FIG. 2. FIG. 2 is a block diagram of an exemplary hardware configuration of the information processing apparatus 1 according to the present embodiment.

As shown in FIG. 2, the information processing apparatus 1 includes a central processing unit (CPU) 101, a read-only memory (ROM) 102, a random access memory (RAM) 103, a host bus 104, a bridge 105, an external bus 106, an interface 107, an input unit 108, an output unit 109, a storage unit 110, a plurality of connection ports (e.g., connection ports 111A and 111B, sometimes collectively referred to as "connection ports 111"), and a communication unit 112.

The CPU 101 is an exemplary processing apparatus that performs various processing in accordance with various programs. The CPU 101 controls all of components of the information processing apparatus 1. The ROM 102 stores programs and computation parameters used by the CPU 101. The RAM 103 temporarily stores programs executed by the CPU 101 and parameters varying in accordance with the execution of the programs. The CPU 101, the ROM 102, and the RAM 103 are connected with each other via the host bus 104 including a CPU bus.

The host bus 104 is connected to the external bus 106, such as a peripheral component interconnect/interface (PCI) bus, via the bridge 105. The interface 107 is a communication interface that connects the external bus 106 to the units described below.

The input unit 108 includes operation mechanisms, such as a mouse, a keyboard, a touch panel, a button, a switch, and a lever. The input unit 108 further includes an input control circuit for generating an input signal and inputting the input signal to the CPU 101. A user of the information processing apparatus 1 operates the input unit 108 so as to input a variety of data and operational instructions to the information processing apparatus 1.

The output unit 109 includes a display unit, such as a cathode ray tube (CRT) display, a liquid crystal display (LCD), or a lamp, and an audio output unit, such as a speaker. The output unit 109 displays a variety of information, such as a screen displayed in accordance with the operation of an application for an IC card (described in more detail below).

The storage unit 110 includes a storage medium for storing data. For example, the storage unit 110 is composed of a hard disk drive (HDD). The storage unit 110 stores a variety of programs, such as an application, a middleware, an operating system, and a device driver, and a variety of data. However, the storage unit 110 is not limited to an HDD. For example, the storage unit 110 may be composed of a random access storage medium, such as a semiconductor memory, an optical disc, a magnetooptical disc, or a magnetic memory. Note that examples of the semiconductor memory include a flash memory, a static random access memory (SRAM), and an electrically erasable programmable read-only memory (EEPROM).

The connection port 111 connects external peripheral devices (e.g., the above-described reader/writers 2) to the information processing apparatus 1. The connection port 111 includes connection terminals, such as USB and IEEE1394 terminals. The connection port 111 is connected to the CPU 101 via the interface 107, the external bus 106, the bridge 105, and the host bus 104. When the reader/writers 2A and 2B are connected to the connection ports 111A and 111B, the information processing apparatus 1 can communicate with the IC cards 3A and 3B via the reader/writers 2A and 2B so as to receive and transmit a variety of data, such as a command and a response message, from and to the IC cards 3A and 3B. The number of installed connection ports 111 may be increased or decreased so that one reader/writer 2 or three or more reader/writers 2 may be connected to the information processing apparatus 1.

The communication unit 112 includes a communication device for communicating with a network, such as the Internet, a local area network (LAN), and a telephone network (neither is shown). The communication unit 112 communicates a variety of data with external apparatuses via that network.

Figure 3:
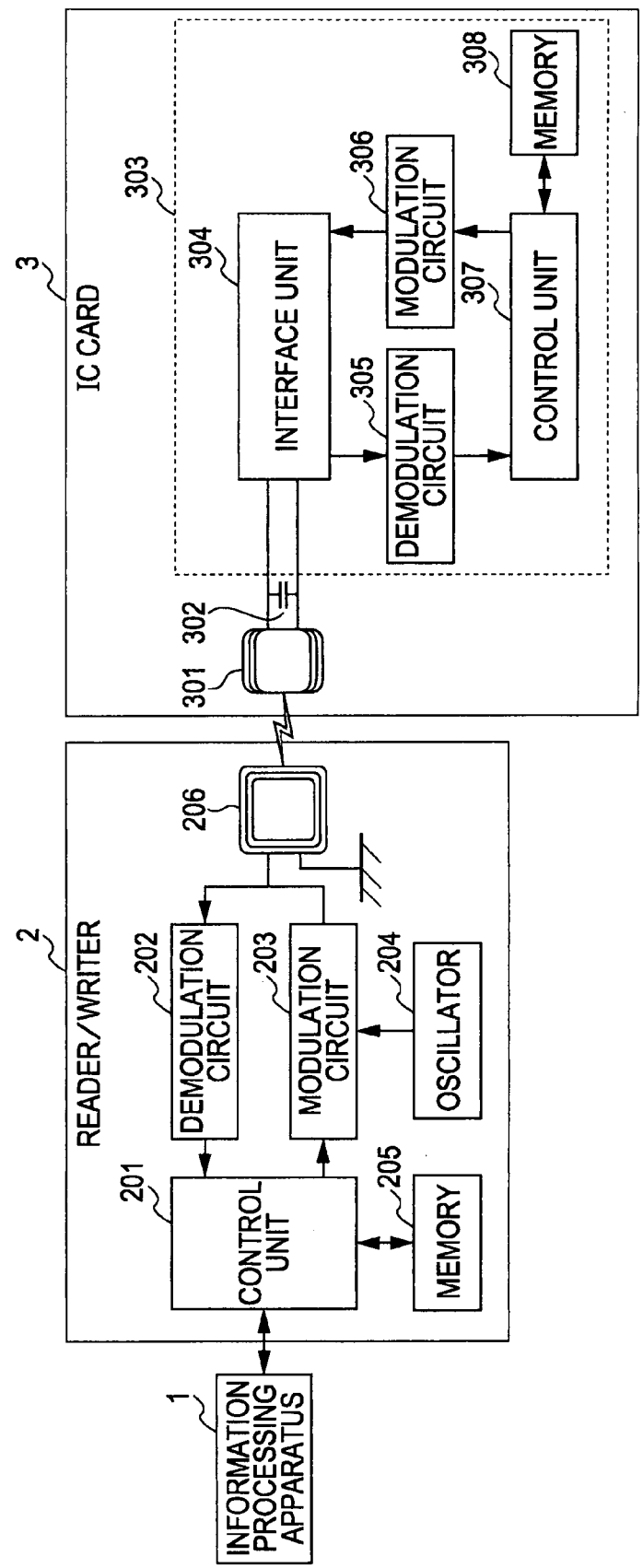
FIG. 3 is a block diagram of the hardware configurations of the reader/writer and the IC card according to the first embodiment.

Exemplary hardware configurations of the reader/writers 2 and the IC card 3 according to the present embodiment are described next with reference to FIG. 3. FIG. 3 is a block diagram of the hardware configurations of the reader/writers 2 and the IC card 3 according to the present embodiment.

An exemplary hardware configuration of the reader/writers 2 is described first. As shown in FIG. 3, each of the reader/writers 2 includes a control unit 201, a modulation circuit 203, a demodulation circuit 202, an oscillator 204, a memory 205, and an antenna 206.

The control unit 201 is composed of an integrated circuit (IC) including a variety of processors and memories, such as a ROM and a RAM. The control unit 201 controls each of components of the reader/writers 2 using the memory 205 (e.g., a flash memory). In addition, the control unit 201 processes data (e.g., a command) input from the information processing apparatus 1 and outputs the data to the modulation circuit 203 so as to transmit the data to the IC card 3. Furthermore, the control unit 201 receives data transmitted from the IC card 3 using the demodulation circuit 202. Still furthermore, the control unit 201 communicates with the information processing apparatus 1. Yet still furthermore, the control unit 201 performs an authentication process between the reader/writer 2 and the IC card 3 when communicating with the IC card 3 and sends the result of the authentication to the information processing apparatus 1.

The modulation circuit 202 modulates carrier waves having a predetermined frequency and being supplied from the oscillator 204 using the data input from the control unit 201, for example, in an amplitude shift keying (ASK) modulating manner. The modulation circuit 202 then transmits the modulated waves to the IC card 3 via the antenna 206. In contrast, the demodulation circuit 203 demodulates modulated waves received from the IC card 3 via the antenna 206 and delivers the demodulated data to the control unit 201.

An exemplary hardware configuration of the IC card 3 is described next. As shown in FIG. 3, the IC card 3 includes an antenna 301, a capacitor 302, and an IC 303. The IC 303 receives and transmits modulation waves from and to each of the reader/writers 2 via the antenna 301. The capacitor 302 forms an LC circuit together with the antenna 301. The LC circuit resonates with electromagnetic waves having a predetermined carrier frequency. The IC 303 includes an interface unit 304, a modulation circuit 306, demodulation circuit 305, a control unit 307, and a memory 308.

The interface unit 304 outputs a signal obtained by detecting the modulated waves received via the antenna 301 to the demodulation circuit 305. In addition, the interface unit 304 transmits a signal input from the control unit 307 via the modulation circuit 306 to the reader/writer 2 via the antenna 301. Furthermore, the interface unit 304 stabilizes the detected signal using a voltage regulator (not shown) and delivers the detected signal serving as a power source to each of the circuits.

The demodulation circuit 305 demodulates the signal input from the interface unit 304 and outputs the demodulated data to the control unit 307. The modulation circuit 306 modulates data input from the control unit 307 and outputs the modulated data to the interface unit 304.

The control unit 307 performs a predetermined process in response to the data (a command) input from the demodulation circuit 305. Examples of the predetermined process include a read/write process of data from and to the memory 308 and a computing process of data input from and output to the control unit 307. In addition, the control unit 307 manages (appends, updates, or deletes) data stored in the memory 308. Furthermore, the control unit 307 generates response data (a response message) corresponding to the above-described process and outputs the response message to the modulation circuit 306, which transmits the response message to the reader/writer 2. The control unit 307 can decode data input from the demodulation circuit 305 or encode data to be output to the modulation circuit 306 using a Manchester encoding method. Furthermore, the control unit 307 can decrypt data input from the demodulation circuit 305 or encrypt data to be output to the modulation circuit 306.

The memory 308 is a storage unit for storing a variety of data related to the IC card 3. For example, the IC card 3 is composed of a semiconductor memory, such as a flash memory, a SRAM, an EEPROM, or a ROM. The memory 308 stores, for example, a card ID that is unique to the IC card 3 and electronic money information indicating the balance of the charged electronic money. In addition, the memory 308 stores a program (an operating system (OS) of the IC card 3) for the control unit 307 to perform the following processes: analysis of a command, generation of a response message, data read/write operation from and to the memory 308, and encoding and encrypting data. This information remains in the memory 308 even after the communication between the IC card 3 and the reader/writer 2 is completed and the power supply stops.

Examples of the communication protocol between the IC card 3 and each of the reader/writers 2 include the near field communication (NFC) protocol, the ISO/IEC14443 protocol, the ISO/IEC15693 for a radio frequency (RF) tag, the Bluetooth protocol, the ultra wide band (UWB) protocol, and the IEEE802.11b protocol.

In such a configuration, data (a command and a response message) can be contactlessly communicated between the reader/writer 2 and the IC card 3. Accordingly, the reader/writer 2 can read information stored in the IC card 3 and write information onto the IC card 3. For example, the reader/writer 2 can read a card ID stored in the IC card 3 and perform an authentication process or can read and update electronic money information (a balance of money) stored in the IC card 3. At that time, since the data is contactlessly exchanged, the user can rapidly and easily instruct the reader/writer 2 to read and write data from and to their own IC card 3 simply by moving the IC card 3 to within a predetermined distance from the reader/writer 2.

Figure 4:
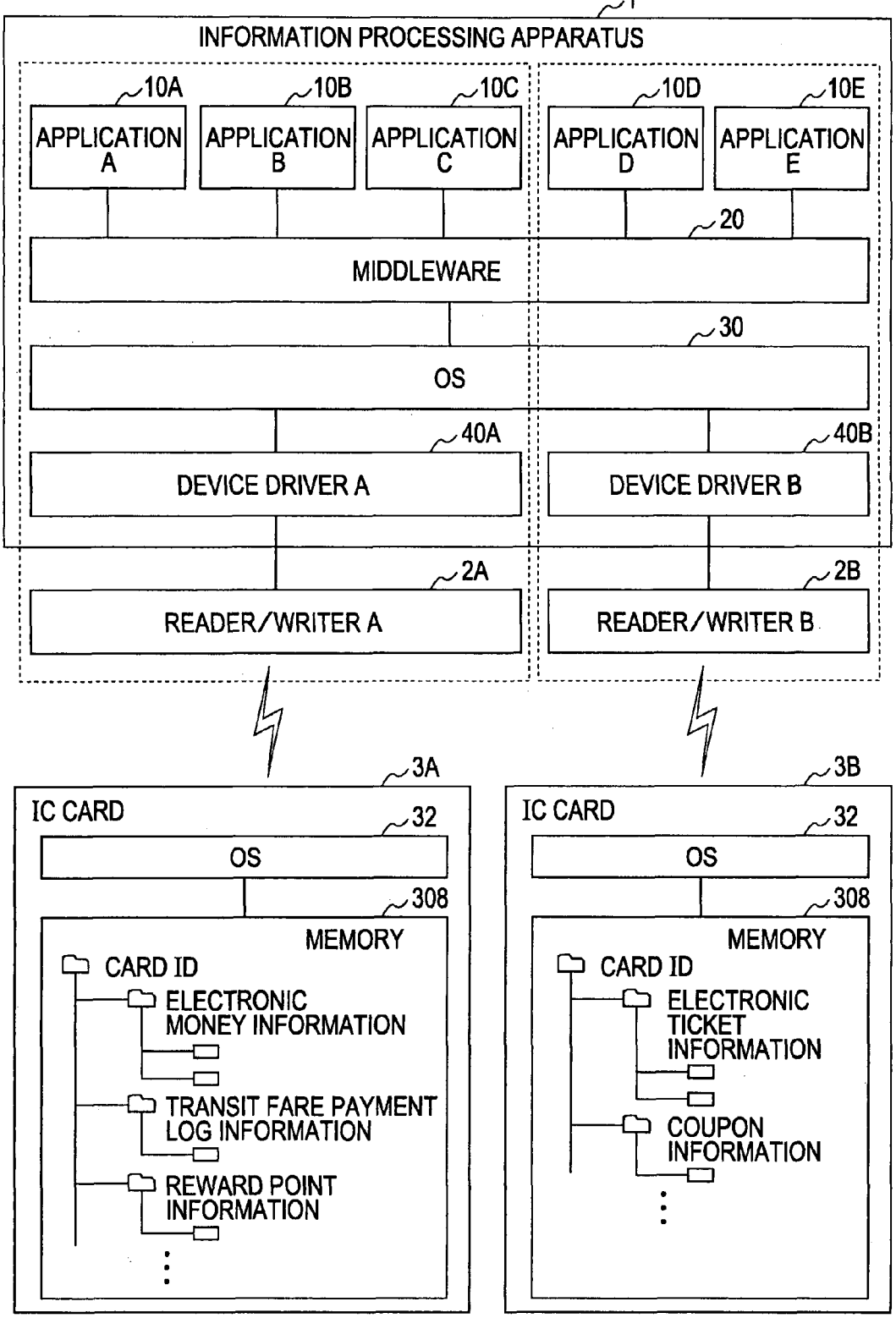
FIG. 4 is a block diagram of the software configurations of the information processing apparatus and the IC card according to the first embodiment.

Exemplary software configurations of the information processing apparatus 1 and the IC card 3 according to the present embodiment are described next with reference to FIG. 4. FIG. 4 is a block diagram of the software configurations of the information processing apparatus 1 and the IC card 3 according to the present embodiment.

As shown in FIG. 4, the information processing apparatus 1 includes a plurality of applications 10A, 10B, 10C, 10D, 10E, . . . (hereinafter sometimes collectively referred to as "applications 10"), a middleware 20 for using the IC card 3, an operating system (OS) 30, and a plurality of device drives 40A, 40B, . . . (hereinafter sometimes collectively referred to as "device drives 40") for operating the reader/writer 2. That is, according to the present embodiment, the software configuration of the information processing apparatus 1 has the following four layers: the application 10, the middleware 20, the OS 30, and the device driver 40. A program stored in the storage unit 110 functions as each of the device drivers 40 when the CPU 101 reads out the program. Software in each layer is described next.

The application 10 is software that provides a user of the IC card 3 with a particular service. More specifically, for example, the applications 10 provides a variety of services, such as a login authentication function using the IC card 3, a display function of log information about transit fare payment (e.g., railroad ticket), a display function of a balance of electronic money charged in the IC card 3, an inquiry function of points of a point-reward system charged in the IC card 3, and a display function of coupons and electronic tickets stored in the IC card 3.

The application 10 operates in cooperation with the middleware 20 and the device drivers 40 so as to provide the user with the above-described various services. The application 10 may be preinstalled in the information processing apparatus 1 at a delivery time or may be installed in the information processing apparatus 1 afterward by the user. In addition, the application 10 installed in the information processing apparatus 1 may be updated (upgraded) or uninstalled afterward.

To execute the above-described function, the application 10 instructs the middleware 20 to generate a command to be transmitted to the IC card 3. Examples of the command include a polling command for requesting a search for a predetermined IC card 3 present in the vicinity of the reader/writer 2, a command for reading out a variety of information stored in the IC card 3 (e.g., card ID, electronic money information, shopping history information, transit fare payment log information, coupon information, and electronic ticket information), and a command for writing a variety of information onto the IC card 3 or updating the information stored in the IC card 3. In addition, the information processing apparatus 1 receives a response message in response to the command from the IC card 3 via the reader/writer 2. On the basis of information contained in the response message, the application 10 provides the user with the above-described service (e.g., display of the balance of electronic money).

The middleware 20 is software that provides each of the applications 10 with a basic function commonly used by the applications 10. Thus, the middleware 20 can provide general-purpose functions used by a plurality of applications 10. Therefore, the need for duplicated development of the general-purpose functions by developers of the applications 10 can be eliminated. The middleware 20 is provided in the form of a common library (e.g., in a dynamic link library (DDL) format of Microsoft Windows (trade name)).

More specifically, the middleware 20 has application program interfaces (APIs) that are commonly used by the applications 10 so as to provide the applications 10 with these APIs. Each of these APIs is a set of commands and functions for facilitating the development of each of the applications 10. Simply by invoking the API, the applications 10 can execute a basic function related to the use of the IC card 3 (e.g., a request for execution of a command).

In addition, the middleware 20 has capability to control the reader/writer 2 and the IC card 3 via the OS 30 and the device driver 40. More specifically, the middleware 20 generates a variety of commands in response to a command generation instruction from the application 10 and outputs the generated command to the device driver 40 in order to request the execution of the command (i.e., transmission of the command to the IC card 3 via the reader/writer 2). Furthermore, the middleware 20 receives a response message returned by the IC card 3 in response to that command via the reader/writer 2 and the device driver 40. Subsequently, the middleware 20 outputs the received response message to the application 10. Thus, the middleware 20 accesses the reader/writer 2 via the device driver 40.

Additionally, the reader/writers 2 that each of the applications 10 can access are predefined. For example, in an example shown in FIG. 4, it is determined that the applications 10A, 10B, and 10C use the reader/writer 2A whereas the applications 10D and 10E use the reader/writer 2B. The middleware 20 has a list indicating a correspondence between each of the applications 10 and one or more available reader/writers 2 (i.e., a list of the reader/writers 2 that are accessible from each of the applications 10). The middleware 20 can scan the reader/writers 2 using this list so as to determine the reader/writers 2 that the applications 10 can use. In addition, the application 10 can specify the reader/writers 2 that the application 10 uses, and the middleware 20 can allocate the specified reader/writers 2 to that application 10. Such a function of the middleware 20 allows each of the applications 10 to smoothly execute a command transmission and a response message reception through an appropriate reader/writer 2 when a plurality of the reader/writers 2 are connected to a plurality of the information processing apparatuses 1.

The OS 30 is basic software that performs overall control of the information processing apparatus 1. The OS 30 provides the applications 10 and the middleware 20 with basic functions, such as an input/output function performed by the input unit 108 and the output unit 109 and a function of managing the storage unit 110.

The device driver 40 is software that operates one of the reader/writers 2. In response to a command received from the middleware 20, the device driver 40 controls the one of the reader/writers 2. The device driver 40 is provided for each of the reader/writers 2. In the example shown in FIG. 4, the device driver 40A corresponding to the reader/writer 2A and the device driver 40B corresponding to the reader/writer 2B are provided. However, the configuration of the device drivers 40 is not limited thereto. One device driver 40 or three or more device drivers 40 may be provided. When one of the reader/writers 2 is connected to the information processing apparatus 1, the OS 30 loads the device driver 40 corresponding to the connected reader/writer 2 and creates an instance of the device driver 40.

The device drivers 40 processes the command received from the application 10 via the middleware 20 and outputs the processed command to the reader/writer 2. Upon receiving the command, the reader/writer 2 transmits the command to the IC card 3. In addition, the device driver 40 analyzes a response message received from the IC card 3 via the reader/writer 2 and outputs the response message to the middleware 20.

If the device driver 40 receives a plurality of commands from a plurality of the applications 10 via the middleware 20, the device driver 40 sequentially processes these commands in the order in which the commands are received. More specifically, upon receiving a command execution request from the middleware 20, the device driver 40 determines whether it processes a command received from one of the applications 10. If the device driver 40 does not process any command, the device driver 40 executes a process requested by the received command. However, if the device driver 40 is processing any command, the device driver 40 places the received command in a wait mode. After the currently processed command has been completed, the device driver 40 processes the received command. In this way, the device driver 40 sequentially processes a plurality of commands received from a plurality of the applications 10 in the order in which the commands are received. Accordingly, a plurality of the applications 10 can concurrently use one reader/writer 2. Thus, a multi-application environment can be appropriately realized.

In addition, the device driver 40 can switch between a shared mode in which a plurality of the applications 10 can simultaneously access one of the reader/writers 2 and a dedicated mode in which only one of the applications 10 can access one of the reader/writers 2. In the shared mode, even when one application 10A uses the reader/writer 2A, another application 10B can access that reader/writer 2A. In contrast, in the dedicated mode, when one application 10A uses the reader/writer 2A, another application 10B is not allowed to access the reader/writer 2A. For example, the device driver 40 can switch between the shared mode and the dedicated mode in accordance with a mode selection requested by the application 10 via the middleware 20.

When the device driver 40 is switched from the dedicated mode to the shared mode, as noted above, a plurality of applications 10 in the information processing apparatus 1 can concurrently use one of the reader/writers 2. Accordingly, a multi-application environment can be suitably provided. In contrast, in the dedicated mode, since one of the applications 10 exclusively uses one of the reader/writers 2 and sends commands and receives response messages to and from the one of the reader/writers 2, the one of the applications 10 can stably perform its own function for the IC card 3.

Furthermore, in the shared mode, upon receiving an access-right request from one of the applications 10, the device driver 40 provides the one of the applications 10 with an exclusive access right for accessing the reader/writer 2. Still furthermore, upon receiving an access-right termination request from the one of the application 10 having the access right, the device driver 40 withdraws the access right from the one of the applications 10. Such a usage of the access right creates a critical section from the provision to the withdrawal of the access right even in the shared mode. During the critical section, the device driver 40 continuously processes only commands received from the one of the applications 10 and places commands received from the applications 10 other than the one of the applications 10 in a wait mode without processing the commands. The access right is described in more detail later.

The device driver 40 limits the number of applications 10 concurrently accessible to the reader/writer 2 corresponding to the device driver 40 to a predetermined maximum access number or less. Thus, overload of the information processing apparatus 1 or the reader/writer 2 can be prevented from occurring when more than the maximum access number of the applications 10 access the reader/writer 2.

The software configuration of the IC card 3 is described next with reference to FIG. 4. As shown in FIG. 4, the IC card 3 includes only an operating system (OS) 32. The IC card 3 does not include any application for IC cards. In addition, the user cannot install an application on the IC card 3 afterward. The memory 308 of the IC card 3 stores a data file having a directory structure. This data file stores a variety of information, such as electronic money information, transit fare payment log information, reward point information, electronic ticket information, and coupon information. The OS 32 reads and writes such information in accordance with a command received from the information processing apparatus 1 via the reader/writer 2.

As noted above, according to the present embodiment, the IC card 3 does not include any application for IC cards. Thus, the IC card 3 has a simple configuration so as to only read and write data from and to the memory 308 in accordance with a command received from the information processing apparatus 1. In addition, the IC card 3 cannot modify a command determined by the OS 32 (cannot change the meaning of the command or add a new command). Accordingly, when a plurality of the applications 10 are installed in the information processing apparatus 1, the middleware 20 and the device driver 40 need to be appropriately designed in order to realize sufficient multi-application environment.

Figure 5:
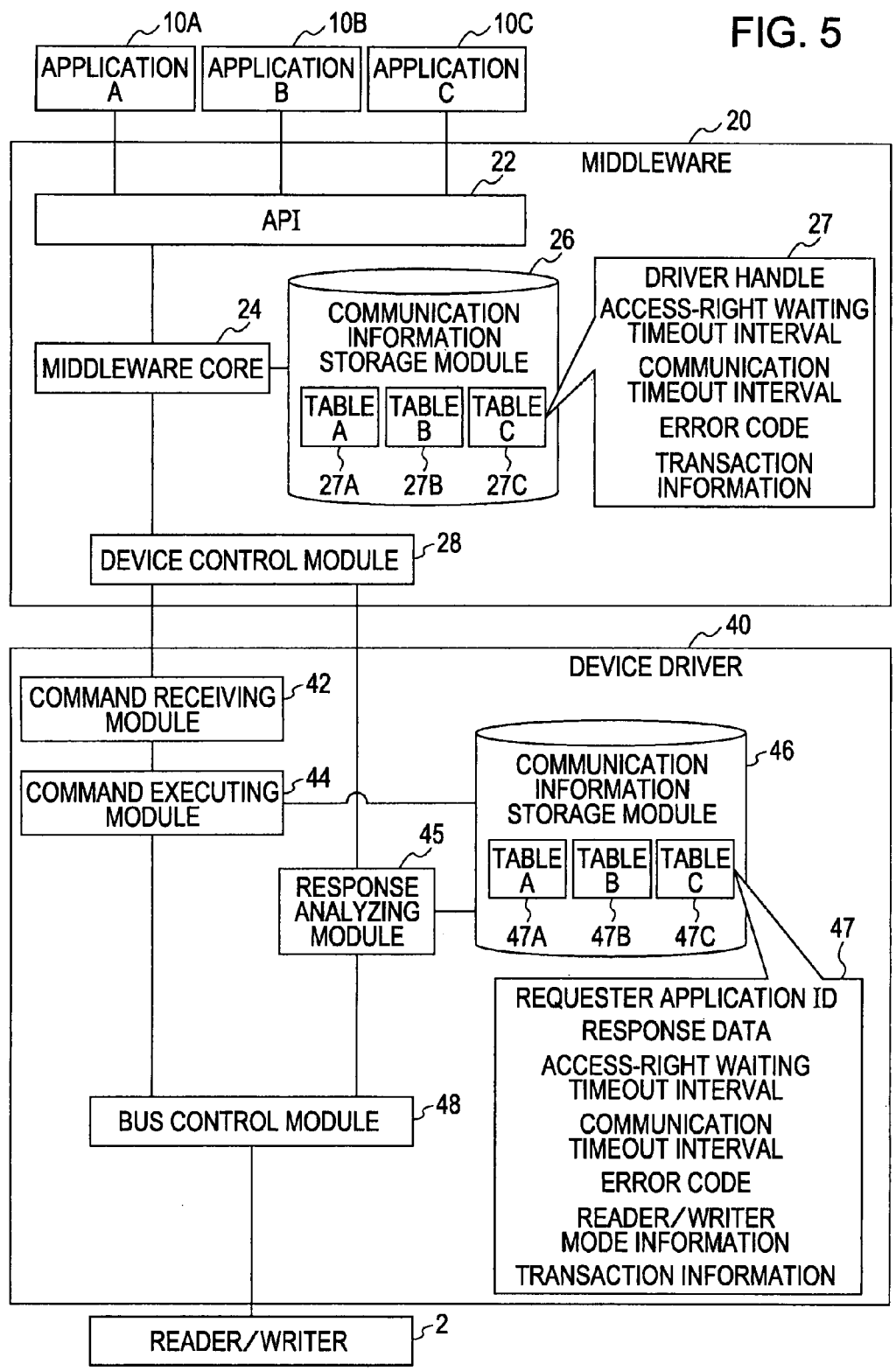
FIG. 5 is a block diagram of a middleware and a device driver according to the first embodiment.

The configurations of the middleware 20 and the device driver 40 according to the present embodiment are described in more detail below with reference to FIG. 5. FIG. 5 is a block diagram of the configurations of the middleware 20 and the device driver 40 according to the present embodiment.

The configuration of the middleware 20 is described first. As shown in FIG. 5, the middleware 20 includes an API 22, a middleware core 24, and a communication information storage module 26, and a device control module 28.

The API 22 is a set of commands and functions used by the applications 10 when the applications 10 use the reader/writer 2 and the IC card 3. Since the API 22 provided by the middleware 20 is a set of basic functions that a plurality of the applications 10 commonly use, the development of the applications 10 can be facilitated.

Particular examples of the API 22 provided by the middleware 20 are described next. For example, the middleware 20 provides the API 22 for generating a command for transmitting data to the IC card 3. Accordingly, by using this API 22, each of the applications 10 can instruct the middleware 20 to generate such a command.

In addition, the middleware 20 provides the API 22 for allowing the applications 10 to specify a connection port name (e.g., a USB port name) of the reader/writer 2 (the target reader/writer 2 to be accessed) and the data transfer rate. Accordingly, by using this API 22, one of the applications 10 can instruct the middleware 20 to identify the target reader/writer 2 to be accessed and the data transfer rate between the one of the applications 10 and the reader/writer 2.

In addition, the middleware 20 provides the API 22 for allowing the applications 10 to select between the above-described shared mode and dedicated mode. Accordingly, by using this API 22, one of the applications 10 can select one of the shared mode and the dedicated mode when accessing the reader/writer 2. The device driver 40 switches between the shared mode and the dedicated mode in accordance with the mode selection of the one of the applications 10.

Furthermore, the middleware 20 provides the API 22 for allowing one of the applications 10 to request the device driver 40 to grant or withdraw an access right for accessing the reader/writer 2 to and from the one of the applications 10. Accordingly, when one of the applications 10 needs to continuously process a series of commands, the one of the applications 10 requests the device driver 40 to grant or withdraw the access right via the middleware 20 by using this API 22. Thus, the one of the applications 10 can have an exclusive access right for accessing the reader/writer 2 or terminate the access right.

The middleware core 24 is the heart of the middleware 20. In response to the instruction from one of the applications 10, the middleware core 24 generates various commands, such as the above-described commands, and requests the device driver 40 to execute the command. In addition, the middleware core 24 encodes and decodes the command. Furthermore, the middleware core 24 performs a utility process. Still furthermore, the middleware core 24 outputs the generated command to the device control module 28 and outputs a response message input from the device control module 28 to the one of the applications 10.

In addition, to make one of the reader/writers 2 available to the application 10 (to make one of the reader/writers 2 open), the middleware core 24 scans the reader/writers 2 and selects one of the reader/writers 2 that is available for the application 10. In order to select one of the available reader/writers 2, the middleware core 24 may select one of the reader/writers 2 in accordance with the instruction from the application 10. Alternatively, the application 10 may sequentially select one of the reader/writers 2 using the list of the available reader/writers 2.

Furthermore, the middleware core 24 manages communication information stored in the communication information storage module 26. The communication information storage module 26 is composed of, for example, the storage unit 110 of the information processing apparatus 1. The communication information storage module 26 stores communication information tables 27A, 27B, and 27C (hereinafter sometimes collectively referred to as "communication information tables 27") corresponding to the applications 10A, 10B, and 10C, respectively. The communication information tables 27 contain information about communication statuses between each of the applications 10A, 10B, and 10C and the reader/writer 2. Examples of the communication information include a driver handle, an access-right request timeout interval, a communication timeout interval, error codes, and transaction information. This communication information is described in more detail later.

The device control module 28 requests a command receiving module 42 of the device driver 40 to execute a command generated by the middleware core 24 so as to control the reader/writer 2 and the IC card 3. In addition, the device control module 28 receives a response message from a response analyzing module 45 of the device driver 40 and outputs that response message to the middleware core 24.

The configuration of the device driver 40 is now herein described. As shown in FIG. 5, the device driver 40 includes the command receiving module 42, a command executing module 44, the response analyzing module 45, a communication information storage module 46, and a bus control module 48.

The command receiving module 42 receives a request command from the middleware 20 and requests the command executing module 44 to execute that command. The command executing module 44 executes the command requested by the command receiving module 42 so as to request the bus control module 48 to transmit that command to the IC card 3 via the reader/writer 2. The response analyzing module 45 analyzes a response message received from the reader/writer 2 via the bus control module 48. Subsequently, the response analyzing module 45 outputs the response message to the middleware 20.

The bus control module 48 follows instructions from the command executing module 44 and the response analyzing module 45 so as to control the hardware for communication with the reader/writer 2 in the information processing apparatus 1. Examples of the hardware include the external bus 106, the interface 107, and the connection port 111. The bus control module 48 allows the command executing module 44 and the response analyzing module 45 to communicate a command and a response message with the reader/writer 2.

In the device driver 40 having such a configuration, the command receiving module 42 can set a command receiving mode to the above-described shared mode or dedicated mode in accordance with the mode setting from one of the applications 10. When the command receiving mode is set to the dedicated mode, the command receiving module 42 accepts a command from only the one of the applications 10 that has requested the dedicated mode. Thereafter, the command receiving module 42 requests the command executing module 44 to execute the command. The command receiving module 42 does not accept a command from the applications 10 other than the one of the applications 10.

In contrast, when the command receiving mode is set to the shared mode, the command receiving module 42 accepts commands from a plurality of the applications 10. When the command receiving module 42 receives a plurality of commands from a plurality of the applications 10 in the shared mode, the command receiving module 42 requests the command executing module 44 to sequentially execute the commands in the order in which the commands are received.

More specifically, upon receiving a command execution request from one of the applications 10, the command receiving module 42 determines whether it is in a signal state in which a process for one of the applications 10 other than the one of the applications 10 is not performed. If the command receiving module 42 is in the signal state, the command receiving module 42 requests the command executing module 44 to execute the received command. However, if the command receiving module 42 is in the non-signal state in which a process for one of the applications 10 other than the one of the applications 10 is performed, the command receiving module 42 places the received command in a wait mode. When the process for one of the applications 10 other than the one of the applications 10 is completed and all the command processes placed in the wait mode before the received command is placed are completed, the command receiving module 42 requests the command executing module 44 to execute the received command. As noted above, when all the command processes placed in the wait mode are completed, the command receiving module 42 switches from the non-signal mode to the signal mode so that the subsequent command received from the one of the applications 10 can be processed. In this way, the atomicity of each of the commands can be ensured, that is, the successful execution or unsuccessful execution of each of the commands can be clearly determined.

Furthermore, in the shared mode, the command receiving module 42 can grant or withdraw an access right for the reader/writer 2 to and from one of the applications 10 in response to the access-right acquisition or termination request from the one of the applications 10. Thus, the time period from the acquisition to the termination of the access right for the one of the applications 10 (i.e., the time period from the time when the one of the applications 10 obtains the access right to the time when the one of the applications 10 loses the access right) serves as a critical section. In this critical section, the command receiving module 42 executes only a command received from the one of the applications 10 having the access right and places commands received from the applications 10 other than the one of the applications 10 in a wait mode. In this way, in this critical section, the command receiving module 42 can permit execution of a command sent from the application 10 having the access right and inhibit execution of commands sent from the applications 10 other than the application 10 having the access right.

If a plurality of command execution requests are concurrently sent to one reader/writer 2 from a plurality of the applications 10, the process of the commands is delayed. Thus, the function of the applications 10 may have a negative impact. Accordingly, when the command receiving module 42 receives a command from one of the applications 10 while the command receiving module 42 is processing a command sent from one of the application 10 other than the one of the applications 10 (in the non-signal mode), the command receiving module 42 places the received command in a wait mode from the time when the command receiving module 42 receives the command to the time when a predetermined timeout interval specified by the application 10 has elapsed. If the preceding command processing is completed before the timeout is reached, the command receiving module 42 starts to process the command received from the one of the applications 10 in the wait mode. However, if the timeout is reached before the preceding command processing is completed, the command receiving module 42 sends a timeout error message to the one of the applications 10.

In this way, the command receiving module 42 can determine whether the timeout is reached before the command receiving module 42 starts executing a command received from each of the applications 10. Accordingly, the waiting time of each application 10 can be reduced to less than or equal to the access right waiting timeout interval. Thus, when a plurality of command execution requests are concurrently sent to one reader/writer 2 from the plurality of the applications 10, the negative impact on the applications 10 caused by processing delay of the command can be eliminated. Each of the applications 10 that received a timeout error message from the device driver 40 may retry to send the same command execution request or may display an error message indicating that the command has not been executed to the user.

In addition, during execution of a command, if a communication timeout occurs in the bus control module 48 when the bus control module 48 is communicating with the reader/writer 2, this communication timeout can be notified to each of the applications 10. Accordingly, if the execution of a command is not completed when a predetermined communication timeout is reached due to a communication error between the device driver 40 and the reader/writer 2, each of the applications 10 can detect the communication error.

In addition, the command executing module 44 and the response analyzing module 45 of the device driver 40 manage the communication information stored in the communication information storage module 46. The communication information storage module 46 is composed of, for example, the storage unit 110 of the information processing apparatus 1. The communication information storage module 46 stores communication tables 47A, 47B, and 47C (hereinafter sometimes collectively referred to as "communication tables 47") respectively corresponding to the applications 10A, 10B, and 10C that are accessible to the reader/writer 2. The communication tables 47 contain information about communication between the reader/writer 2 and each of the applications 10A, 10B, and 10C. Examples of the communication information contained in the communication tables 47 include a requester application ID, response data, an access-right waiting timeout interval, a communication timeout interval, an error code, reader/writer mode information, and transaction information.

The requester application ID is an identification (ID) for identifying one of the applications 10 that requested the execution of a command. By using the requester application ID, the communication tables 47A, 47B, and 47C can be associated with the applications 10A, 10B, and 10C, respectively.

The response data is data returned from the IC card 3 to the reader/writer 2 in response to a command transmitted from the reader/writer 2 to the IC card 3. This response data is generated in accordance with a response message received by the reader/writer 2 from the IC card 3 and is stored in the communication table 47 of the device driver 40. Since the response data associated with one of the applications 10 is stored in the communication table 47 corresponding to the one of the applications 10, the device driver 40 can recognize what type of response message is returned to the one of the applications 10 even when the device driver 40 communicates a plurality of commands and response messages with the plurality of the applications 10.

The access-right waiting timeout interval is a maximum time interval for waiting for the execution of a command received from one of the applications 10. A different access-right waiting timeout interval can be set for each of the applications 10. Each application 10 can set its own access-right waiting timeout interval. In the initial stage, the device driver 40 stores the default value (e.g., five seconds) of the access-right waiting timeout interval in each of the communication tables 47. When one of the applications 10 specifies the access-right waiting timeout interval, the device driver 40 changes the access-right waiting timeout interval from the default value to the specified value (e.g., ten seconds).

As noted above, the communication timeout interval is a maximum time interval for limiting the communication time between the device driver 40 and the reader/writer 2. Like the access-right waiting timeout interval, a different communication timeout interval can be set for each of the applications 10. If the device driver 40 does not receive any response message for more than or equal to a predetermined communication timeout interval after the device driver 40 outputs a command to the reader/writer 2, the device driver 40 determines that a communication timeout occurs and notifies the communication timeout to the one of the applications 10.

The error code represents the type of error occurring in the device driver 40. The error code is generated by the device driver 40. By holding the error code, the device driver 40 can recognize which error occurred in the operation of the application 10.

The reader/writer mode information indicates whether one of the applications 10 is accessible to the reader/writer 2. To allow one of the applications 10 to access the reader/writer 2 (i.e., to allow one of the applications 10 to open the reader/writer. 2), a pseudo mutual authentication needs to be performed between the one of the applications 10 and the reader/writer 2. According to the present embodiment, since the device driver 40 has a pseudo mutual authentication capability, the device driver 40 holds information about whether the pseudo mutual authentication is successfully performed in a reader/writer mode information field. Thus, the device driver 40 can recognize which one of the applications 10 is accessible to the reader/writer 2.

The transaction information is information about communication between the device driver 40 and the reader/writer 2.

So far, a variety of communication information contained in the communication table 47 of the device driver 40 has been described. Since a variety of communication information contained in the communication table 27 of the middleware 20 is similar to the communication information contained in the communication table 47, descriptions of the communication information in the communication table 27 is not repeated. However, note that the driver handle in the communication information table 27 indicates an ID for one of the applications 10 to access the device driver 40 via the middleware 20. Therefore, this driver handle indicates which device driver 40 is being accessed by the one of the applications 10.

As mentioned earlier, the device driver 40 and the middleware 20 hold the communication information, such as the timeout interval and a result of communication with the reader/writer 2, for each of the applications 10 that are accessible to the reader/writer 2. Thus, each of the applications 10 can acquire the result of communication from the middleware 20 at any time. Furthermore, the device driver 40 can set any timeout interval for each of the applications 10.

So far, the configuration of the information processing apparatus 1 according to the present embodiment, and in particular, the configurations of the device driver 40 and the middleware 20 have been described. A method for mediating applications in the information processing apparatus 1 having such a configuration is described next.

The open process of the reader/writer 2 in the method for mediating applications of the present embodiment is described first. When one of the applications 10 sends commands and receives response messages using the reader/writer 2, the reader/writer 2 needs to be opened for the one of the applications 10. As used herein, the term "open of the reader/writer 2" refers to an operation in which a pseudo mutual authentication is performed between one of the applications 10 and the reader/writer 2 via the device driver 40 so that the one of the applications 10 can use the reader/writer 2 (e.g., can send commands to and receive response messages from the reader/writer 2). This open process is performed by the middleware 20 to work cooperatively with the reader/writer 2.

The middleware 20 selects one of the reader/writers 2 to be opened in response to an open request (a use request) of the reader/writer 2 sent from one of the applications 10. Subsequently, the middleware 20 requests the device driver 40 corresponding to the selected reader/writer 2 to open the reader/writer 2 (i.e., to allow the one of the applications 10 to use the reader/writer 2 to be opened).

If a plurality of the reader/writers 2 are connected to the information processing apparatus 1, the middleware 20 selects one of the reader/writers 2 to be opened from among the plurality of reader/writers 2 using one of the following two methods: (1) selecting the reader/writer 2 specified by the one of the applications 10; and (2) automatically and sequentially selecting one of the plurality of the reader/writers 2 that is available for the one of the applications 10 in a list held by the middleware 20.

Figure 6:
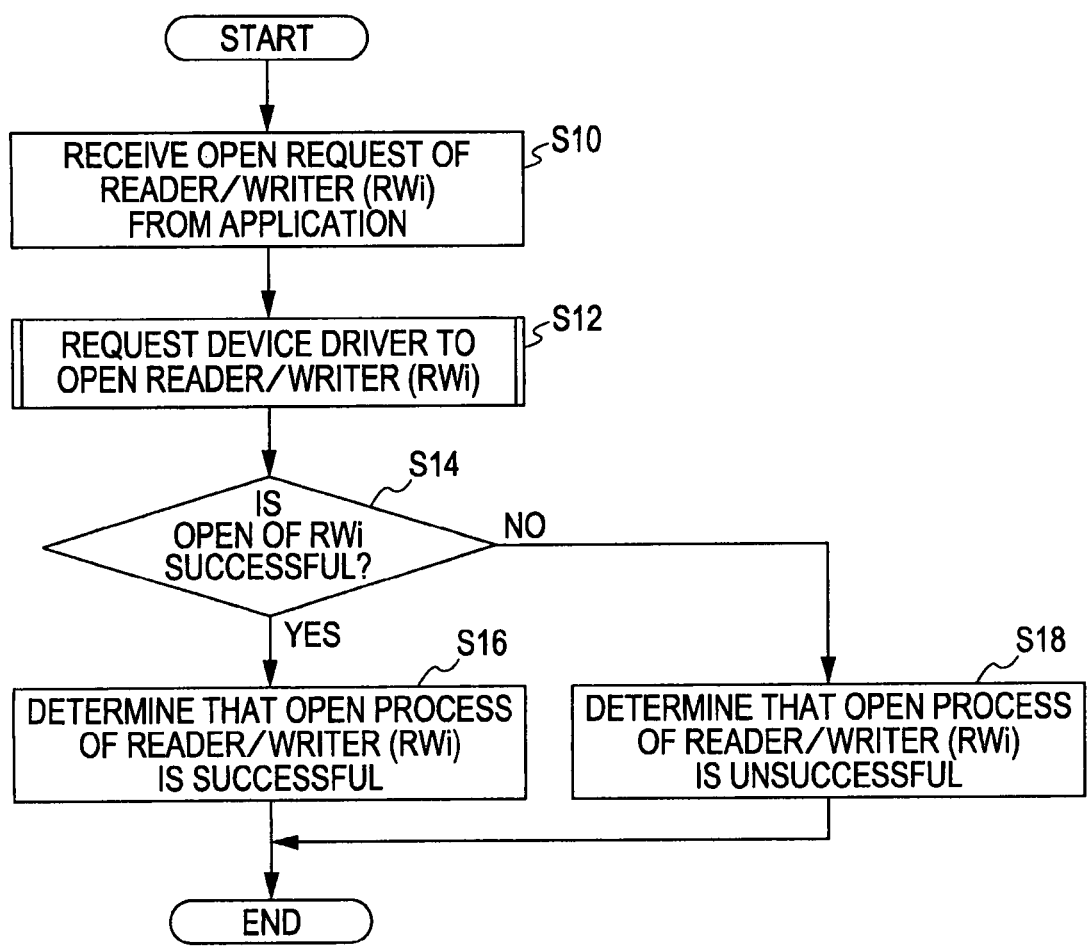
FIG. 6 is a flow chart of a process performed by the middleware according to the first embodiment when the middleware opens a reader/writer specified by an application.

A process flow performed by the middleware 20 using the above-described selection method (1) is described next with reference to FIG. 6. FIG. 6 is a flow chart of an process performed by the middleware 20 according to the present embodiment when the middleware 20 opens one of the reader/writers 2 specified by the one of the applications 10.

As shown in FIG. 6, the middleware 20 receives, from one of the applications 10, an open request of the reader/writer 2 (RWi) specified by the one of the applications 10 (step S10). Each of the applications 10 holds identification information about the reader/writers 2 (e.g., port names or reader/writer IDs) that the each of the application 10 can use. When the one of the applications 10 sends an open request to the middleware 20, the one of the applications 10 attaches the identification information about the reader/writer 2 (RWi) to be opened to that open request so as to specify the reader/writer 2 to be opened. The middleware 20 selects the reader/writer 2 (RWi) specified by the one of the applications 10 as the reader/writer 2 to be opened.

Subsequently, the middleware 20 requests the device driver 40 corresponding to the reader/writer 2 (RWi) specified by the one of the application 10 to open that reader/writer 2 (RWi) (step S12). Upon receiving the open execution request, the device driver 40 determines whether the specified reader/writer 2 (RWi) is accessible to the one of the applications 10 on the basis of a predetermined condition. If the specified reader/writer 2 (RWi) is accessible to the one of the applications 10, the device driver 40 opens the reader/writer 2 (RWi). However, if the specified reader/writer 2 (RWi) is not accessible to the one of the applications 10, the device driver 40 does not open the reader/writer 2 (RWi). This operation performed by the device driver 40 is described in more detail later with reference to FIG. 8.

Thereafter, the middleware 20 determines whether the open process of the reader/writer 2 (RWi) has been successful on the basis of a message indicating a successful or unsuccessful open sent from the device driver 40 (step S14). If the open process of the reader/writer 2 (RWi) is successful, the middleware 20 performs a variety of settings (e.g., setting of the communication information table 27) so that the one of the applications 10 that sent the open request can use the reader/writer 2 (RWi). The middleware 20 then sends a message indicating a successful open to the one of the applications 10 (step S16). In this case, the one of the applications 10 can use the reader/writer 2 (RWi) and can send commands to and receive response messages from the reader/writer 2. However, if the open process of the reader/writer 2 (RWi) is unsuccessful, the middleware 20 sends a message indicating an unsuccessful open to the one of the applications 10 that sent the open request (step S18). In this case, the one of the applications 10 cannot use the reader/writer 2 (RWi), and therefore, the one of the applications 10 cannot send commands to and receive response messages from the reader/writer 2 (RWi).

As shown by the process flow in FIG. 6, the middleware 20 performs control so as to open one of the reader/writers 2 specified by the one of the applications 10.

Figure 7:
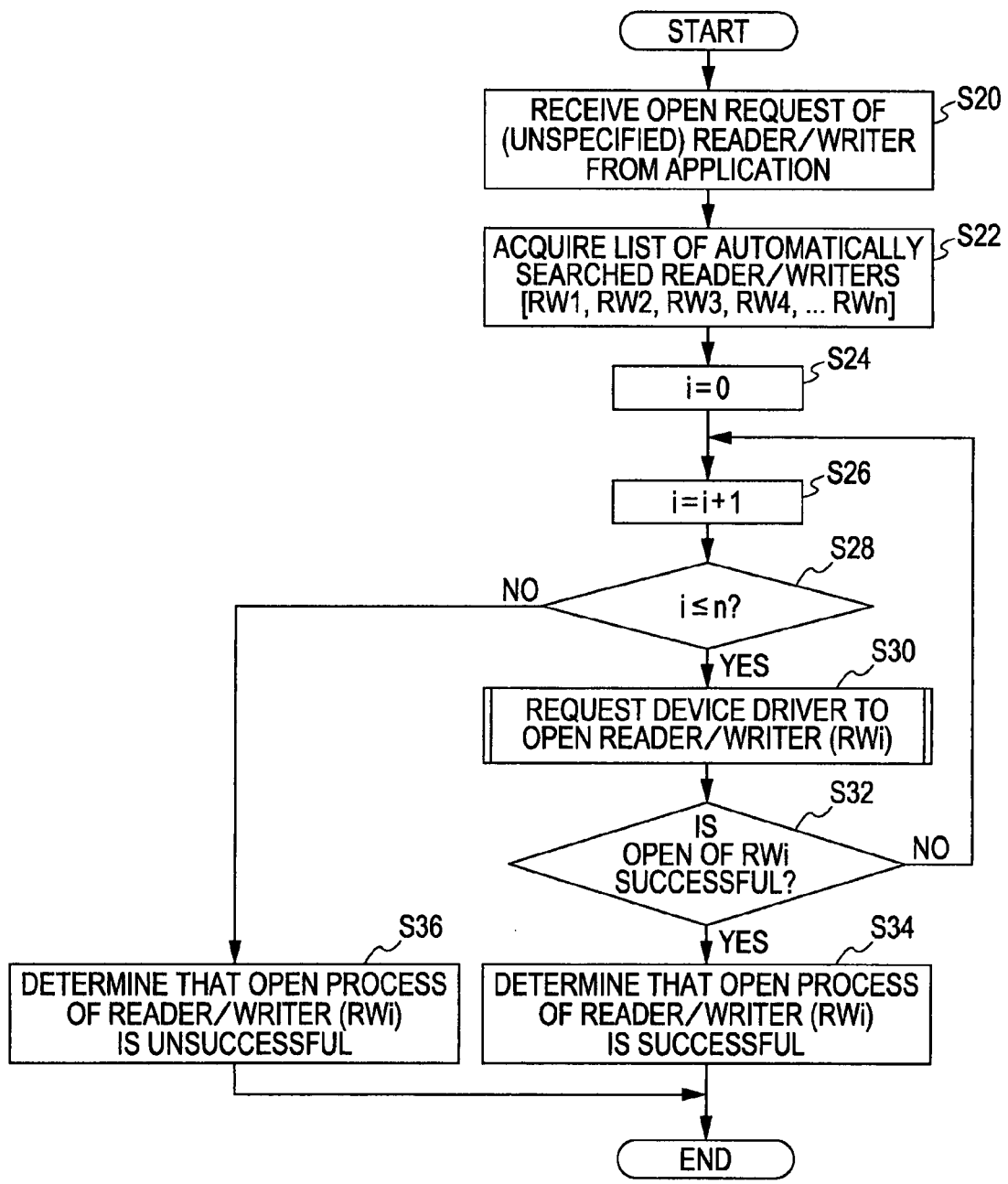
FIG. 7 is a flow chart of a process performed by the middleware according to the first embodiment when the middleware sequentially scans a plurality of the reader/writers and opens the available reader/writers.

A process flow performed by the middleware 20 using the above-described selection method (2) is described next with reference to FIG. 7. FIG. 7 is a flow chart of a process performed by the middleware 20 according to the present embodiment when the middleware 20 sequentially scans a plurality of the reader/writers 2 and opens the available reader/writers 2.

As shown in FIG. 7, the middleware 20 receives, from one of the applications 10, an open request of the reader/writer 2 (i.e., a request to use the reader/writer 2) (step S20). In the process illustrated in FIG. 7, the one of the applications 10 does not specify a specific one of the reader/writers 2 for the middleware 20 and requests the middleware 20 to open some of the reader/writers 2 connected to the information processing apparatus 1. Upon receiving the request, the middleware 20 automatically searches for the reader/writers 2 that are available for the one of the applications 10 and sequentially opens these available reader/writers 2, as described below.

Subsequently, the middleware 20 acquires a list including one or more reader/writers 2 automatically searched for (step S22). The middleware 20 prestores identification information about the reader/writers 2 available for each of the applications 10 in the form of a list of the reader/writers 2 for automatic search. In this way, the reader/writers 2 to be automatically searched for by the middleware 20 are predefined for each application 10. Note that this list of the reader/writers 2 can be changed by the each of the applications 10.

Upon receiving the open request from the one of the applications 10 (as described in step S20), the middleware 20 reads out the list corresponding to the one of the application 10 that sent the open request so as to acquire identification information of the automatically searched reader/writers 2 (step S22). In an example shown in FIG. 7, n reader/writers 2 (RW1, RW2, . . . RWn) are listed as the reader/writers 2 to be opened. In the following description, RW1, RW2, . . . RWn are selected in this order and the open process is performed for the selected one.

More specifically, the middleware 20 sets a variable i to zero as an initial value (step S24). Thereafter, the middleware 20 increments the variable i by one (step S26). Subsequently, the middleware 20 determines whether the variable i is less than or equal to n (step S28). Thus, the middleware 20 selects the reader/writer 2 (RW1) as the reader/writer 2 to be opened.

Subsequently, the middleware 20 requests the device driver 40 corresponding to the reader/writer 2 (RW1) to open that reader/writer 2 (RW1) (step S30). The process in step S30 is similar to that in step S12. The middleware 20 determines whether the reader/writer 2 (RW1) has been successfully opened on the basis of a message indicating a successful or unsuccessful open received from the device driver 40 (step S32). If the open process of the reader/writer 2 (RW1) is successful, the process proceeds to step S34, where the middleware 20 performs a variety of settings so that the one of the applications 10 that sent the open request can use the reader/writer 2 (RW1). The middleware 20 then sends a message indicating a successful open of the reader/writer 2 (RW1) to the one of the application 10 (step S34). However, if the open process of the reader/writer 2 (RW1) is unsuccessful, the process returns to step S26, where the middleware 20 selects the next reader/writer 2 (RW2) in the list as one of the reader/writers 2 to be opened. Subsequently, the middleware 20 attempts to open the reader/writer 2 (RW2) in the same manner described for the reader/writer 2 (RW1).

The middleware 20 repeats such a process until the open process for either one of the reader/writers 2 is successful (step S32). If this open process for all the n reader/writers 2 (RW1, RW2, . . . RWn) is unsuccessful, it is determined at step S28 that the variable i>n, and therefore, the process proceeds to step S36. The middleware 20 sends a message indicating that all the reader/writers 2 cannot be opened to the one of the applications 10 that sent the open request (step S36).

As noted above, in the process flow illustrated in FIG. 7, the middleware 20 automatically and sequentially selects one of the reader/writers 2 to be opened from among the reader/writers 2 (RW1, RW2, . . . RWn) that are available for the application 10 in the predetermined order determined by the list. Subsequently, by sequentially requesting the device drivers 40 corresponding to the selected reader/writers 2 to open the selected reader/writers 2, the middleware 20 attempts to open one of the selected reader/writers 2. In this way, the middleware 20 can automatically search for the reader/writers 2 suitable for the one of the applications 10 so as to open the one of reader/writers 2.

In the above-described process flow illustrated in FIG. 7, if an open process of any one of the reader/writers 2 is successful, the open process is completed without attempting to open the other reader/writers 2. However, the present invention is not limited thereto. For example, the middleware 20 may attempt to open the reader/writers 2 (RW1, RW2, . . . RWn) contained in the list held by the middleware 20 so as to concurrently open a plurality of the reader/writer 2 for the application 10. Examples of the applications 10 that use a plurality of the reader/writers 2 which are concurrently open include an application having questionnaire capability or quiz capability for selecting a user answer from among a plurality of options. Such a type of application 10 can identify a user answer by determining which one of reader/writers 2 associated with the options the IC card 3 is connected to.

Figure 8:
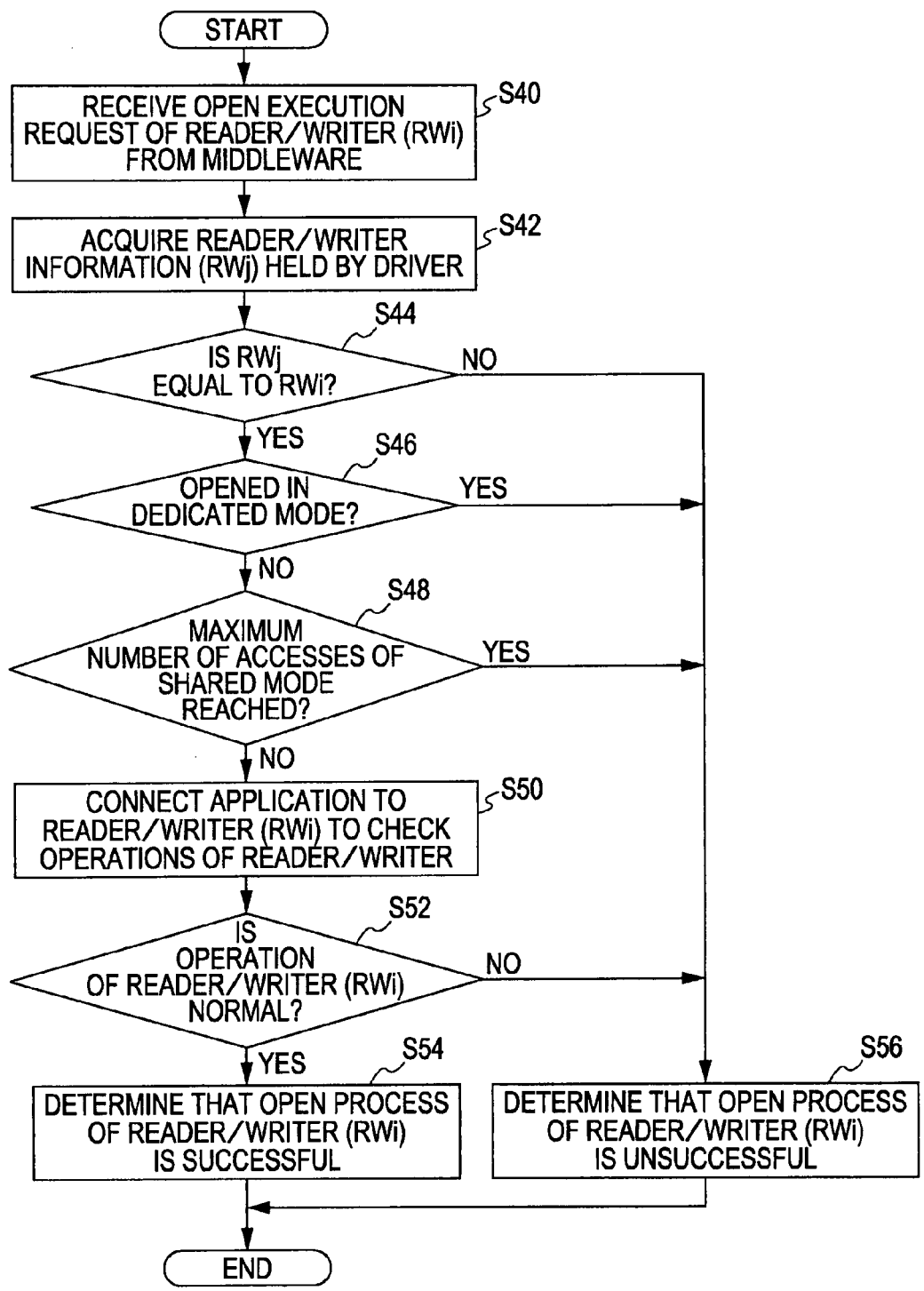
FIG. 8 is a flow chart of a process in which the device driver according to the first embodiment opens one of the reader/writers requested by the middleware.

The process flow in which the device driver 40 according to the present embodiment opens one of the reader/writers 2 requested by the middleware 20 is described next with reference to FIG. 8. FIG. 8 is a flow chart of a process in which the device driver 40 according to the present embodiment opens one of the reader/writers 2 requested by the middleware 20.

As shown in FIG. 8, the device driver 40 receives an open execution request for the reader/writer 2 (RWi) from the middleware 20 (step S40). This open execution request for the reader/writer 2 (RWi) is the one issued at step S12 of the process flow illustrated in FIG. 6 or at step S30 of the process flow illustrated in FIG. 7.

Upon receiving the open execution request, the device driver 40 acquires identification information about the reader/writer 2 (RWj) held by itself (step S42). Subsequently, the device driver 40 determines whether this identification information (RWj) is equal to the identification information (RWi) about one of the reader/writers 2 requested by the middleware 20 (step S44). Since there is a one-to-one correspondence between the device driver 40 and the reader/writer 2, each of the device drivers 40 can control only the reader/writer 2 (RWj) corresponding to itself. Therefore, the device driver 40 compares the identification information (RWj) with the identification information (RWi). If the identification information (RWj) is equal to the identification information (RWi), the device driver 40 can determine that it receives a valid open request for one of the reader/writers 2 corresponding to itself, and therefore, the process proceeds to step S46. However, if the identification information (RWj) is not equal to the identification information (RWi), it is determined that the device driver 40 has received an open request for one of the reader/writers 2 (RWi) that the device driver 40 does not support. Thus, the process proceeds to step S56, where it is determined that the open process of the reader/writer 2 (RWi) is unsuccessful, and the device driver 40 notifies the middleware 20 of that information.

Subsequently, at step S46, the device driver 40 determines whether the reader/writer 2 (RWi=RWj) has been already opened for one of the applications 10 other than the one of the applications 10 in the dedicated mode (step S46). In the dedicated mode, since only one of the applications 10 can use the reader/writer 2 (RWi), an open request from a subsequent one of the applications 10 needs to be inhibited. Therefore, if, at step S46, it is determined that the reader/writer 2 (RWi) is open in the dedicated mode, the process proceeds to step S56. At step S56, it is determined that the open of the reader/writer 2 (RWi) is unsuccessful and the device driver 40 notifies the middleware 20 of that information. In contrast, if it is determined that the reader/writer 2 (RWi) is not opened in the dedicated mode (e.g., the reader/writer 2 (RWi) is not opened by one of the applications 10 other than the one of the applications 10 or the reader/writer 2 (RWi) is opened in the shared mode by the applications 10 other than the one of the applications 10), the process proceeds to step S48.

At step S48, the device driver 40 determines whether the number of the applications 10 that have already accessed the reader/writer 2 (RWi) reaches a predetermined maximum number of accesses (step S48). As mentioned earlier, in the shared mode, a plurality of the applications 10 can concurrently access one of the reader/writers 2. At that time, to reduce the processing load of a processing unit (e.g., the CPU 101) of the information processing apparatus 1, the number of the applications 10 that can concurrently access one of the reader/writers 2 is limited to a value less than or equal to a predetermined maximum number (e.g., eight). Accordingly, at step S46, the device driver 40 determines whether the number of the applications 10 that have accessed the reader/writer 2 (RWi) reaches the predetermined maximum number of accesses. If the number of the applications 10 that have accessed the reader/writer 2 (RWi) reaches the predetermined maximum number of accesses, the process proceeds to step S56. At step S56, the device driver 40 determines that the open process of the reader/writer 2 (RWi) is unsuccessful and notifies the middleware 20 of this information. This operation can prevent excess processing load of the processing unit from occurring when one of the applications 10 requesting the open process is allowed to access the reader/writer 2 (RWi) although the maximum number of the applications 10 have already accessed the reader/writer 2 (RWi). However, if the number of the applications 10 that have accessed the reader/writer 2 (RWi) is not reached the predetermined maximum number of accesses, the process proceeds to step S50.

At step S50, the middleware 20 connects the one of the applications 10 that sent the open request to the reader/writer 2 (RWi) and, subsequently, checks operations of the reader/writer 2 (RWi) (step S50). Thus, the middleware 20 determines whether the reader/writer 2 (RWi) operates without any problem (step S52). If it is determined that the operation of the reader/writer 2 (RWi) is not normal, the process proceeds to step S56. At step S56, the device driver 40 determines that the open process of the reader/writer 2 (RWi) is unsuccessful and notifies the middleware 20 of that information. Thus, the one of the applications 10 does not open the reader/writer 2 (RWi) when reader/writer 2 (RWi) operates abnormally. However, if it is determined that the operation of the reader/writer 2 (RWi) is normal, the process proceeds to step S54. At step S54, the device driver 40 determines that the open process of the reader/writer 2 (RWi) for the one of the applications 10 that sent the open request is successful. The device driver 40 performs a variety of settings (e.g., setting of the communication information table 27) so that the one of the applications 10 that sent the open request can use the reader/writer 2 (RWi). The device driver 40 then sends a message indicating a successful open to the middleware 20 (step S54).

As described above, in response to the open request from the middleware 20, the device driver 40 determines whether the reader/writer 2 (RWi) specified by the middleware 20 is accessible from the one of the applications 10 that sent the open request in accordance with the above-described various conditions (steps S44, S46, S48, and S52). If the reader/writer 2 (RWi) is accessible, the device driver 40 can open the reader/writer 2 (RWi).

So far, the open process of one of the reader/writers 2 in the method for mediating applications according to the present embodiment has been described. A command processing method in the method for mediating applications according to the present embodiment is described in detail next with reference to FIGS. 9A to 9C and FIGS. 10 to 12.

As described above, when the device driver 40 is set to the shared mode, the command receiving module 42 of the device driver 40 sequentially receives a plurality of commands from a plurality of the applications 10 and requests the command executing module 44 to execute the commands in the order in which the commands are received. More specifically, in the shared mode, upon receiving a command execution request from one of the applications 10 via the middleware 20, the command receiving module 42 determines whether the command executing module 44 is processing a preceding command received from the applications 10 other than the one of the applications 10. If it is determined that the command executing module 44 is in the signal mode in which the command executing module 44 is not executing any command, the command receiving module 42 requests the command executing module 44 to immediately execute the received command and changes the signal mode to the non-signal mode. However, if it is determined that the command executing module 44 is in the non-signal mode in which the command executing module 44 is executing the other command, the command receiving module 42 places the received command in a wait mode and requests the command executing module 44 to execute that command immediately after the execution of the other command is completed and the command executing module 44 enters the signal mode.

Figure 9A:
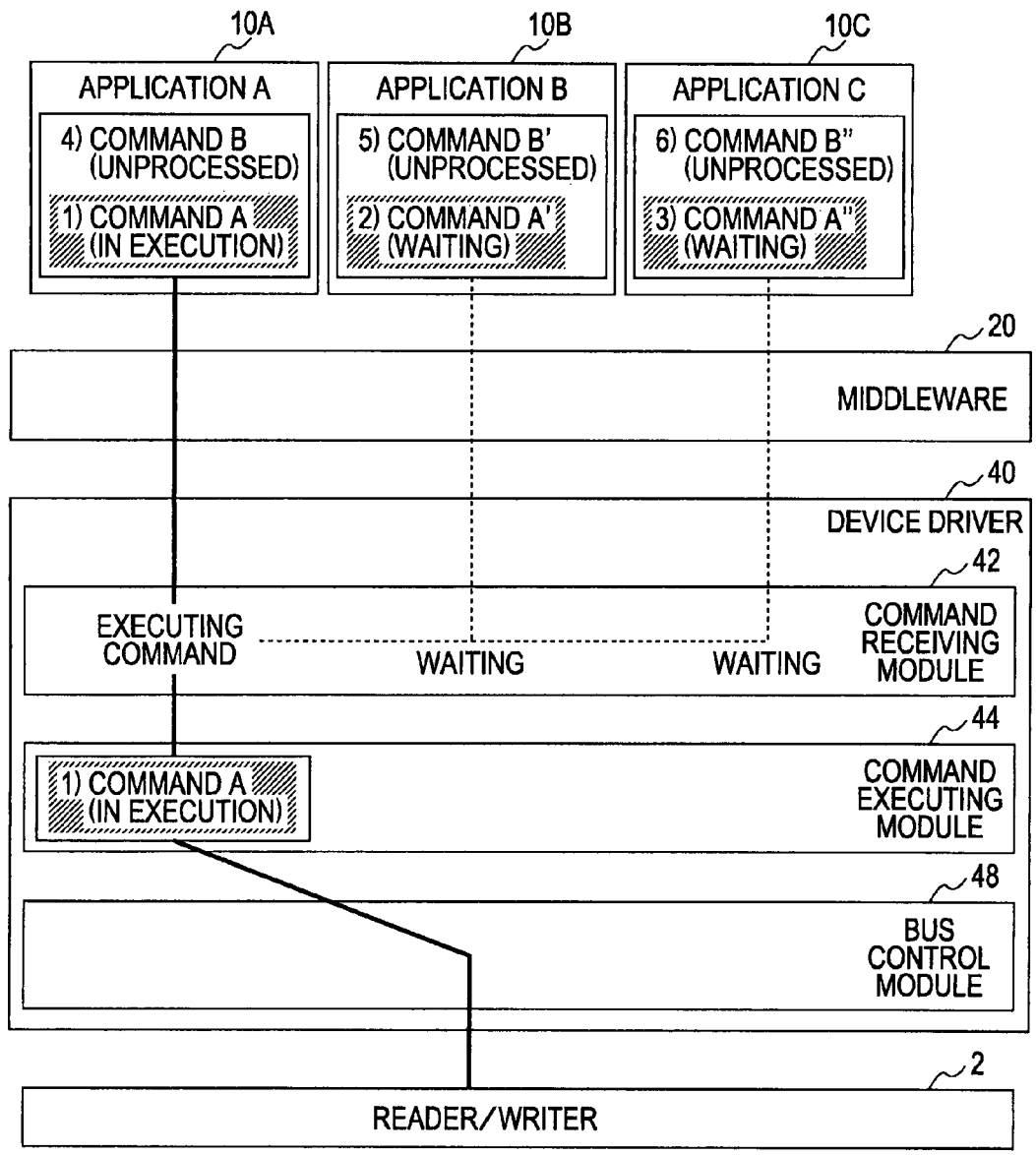
FIG. 9A is a schematic illustration of an example of a method for processing commands received from a plurality of applications according to the first embodiment.
Figure 9B:
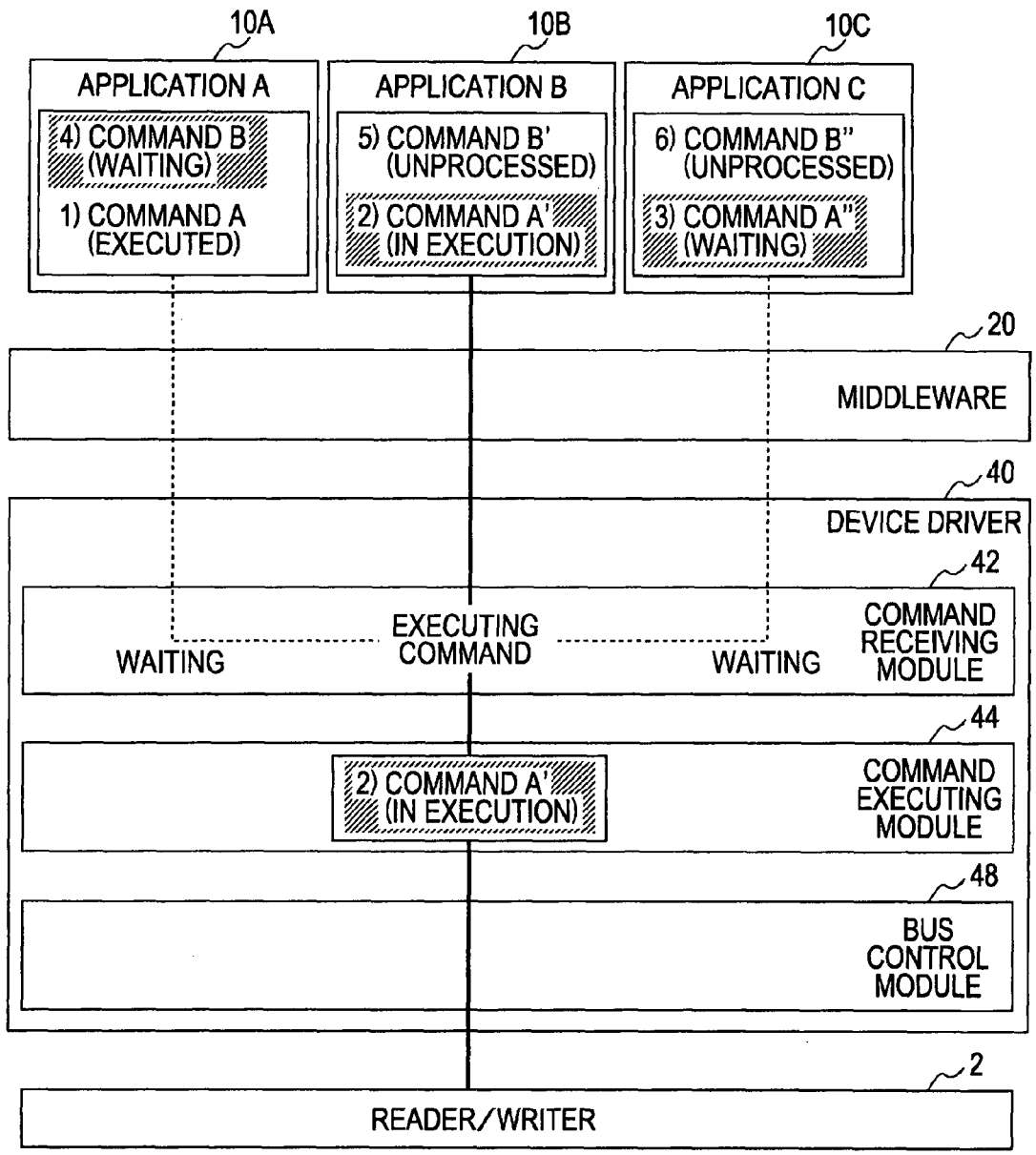
FIG. 9B is a schematic illustration of an example of the method for processing commands received from a plurality of applications according to the first embodiment.
Figure 9C:
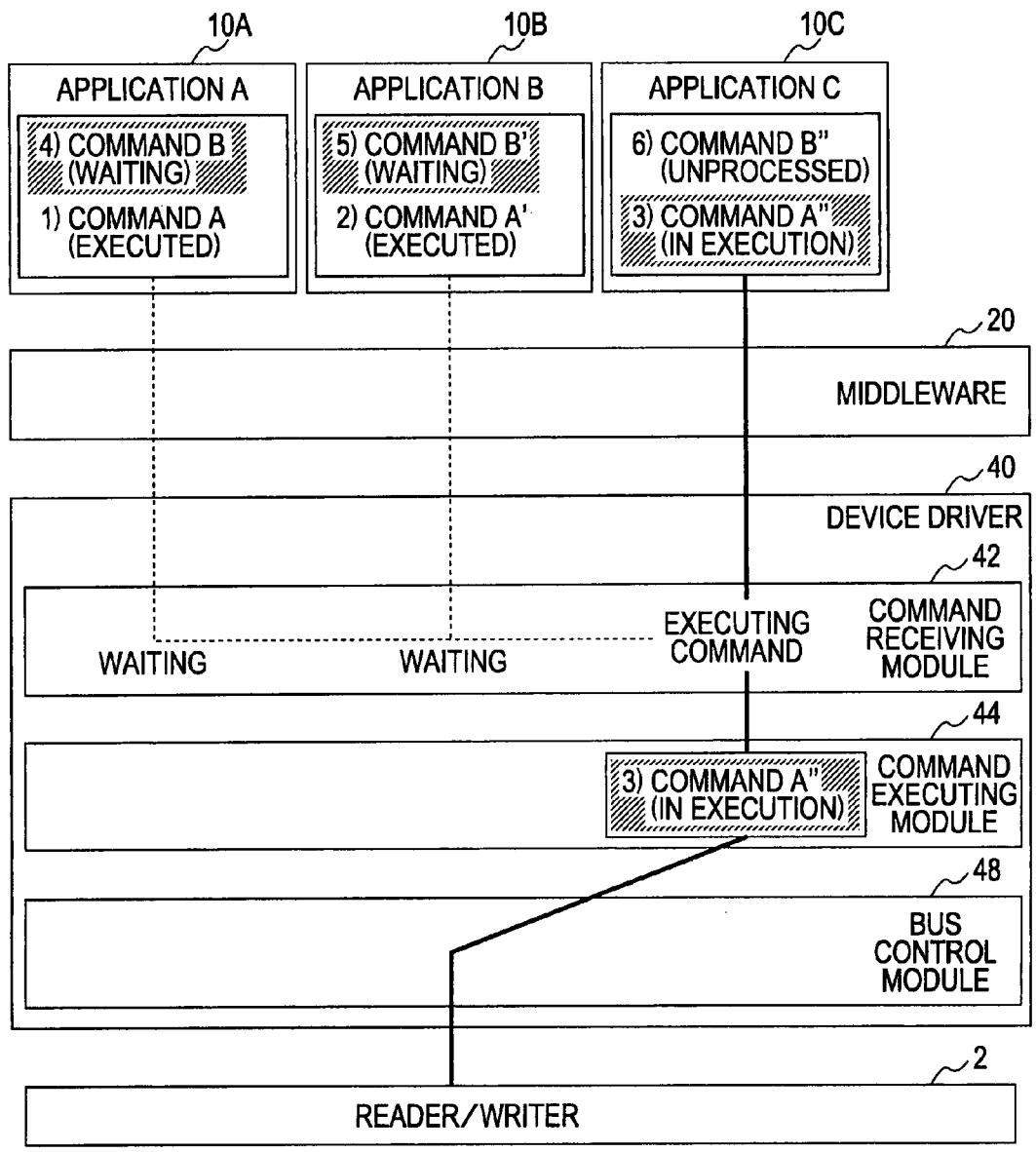
FIG. 9C is a schematic illustration of an example of the method for processing commands received from a plurality of applications according to the first embodiment.

The command processing is now herein described in detail with reference to FIGS. 9A to 9C. FIGS. 9A to 9C are schematic illustrations of a particular example using the method for processing commands received from the plurality of the applications 10 according to the present embodiment.

In FIGS. 9A to 9C, three applications 10A, 10B, and 10C send six command execution requests to the device driver 40 in the following order: 1) a command A, 2) a command A', 3) a command A", 4) a command B, 5) a command B', and 6) a command B".

In this case, as shown in FIG. 9A, the device driver 40 receives the first command A from the application 10A and executes the command A so as to control the corresponding one of the reader/writers 2. During the execution of the command A, the device driver 40 receives the command A' from the application 10B and the command A" from the application 10C and places these commands in an execution wait mode. Note that, at this point of time, the commands B, B', and B" have not been issued yet.

Subsequently, as shown in FIG. 9B, after the execution of the first command A is completed, the device driver 40 executes the second command A' so as to control the one of the reader/writers 2. During the execution of the command A', the device driver 40 receives the command A" from the application 10C and the command B from the application 10A and places these commands in the execution wait mode. Upon receiving a command-A termination message from the device driver 40, the application 10A requests the device driver 40 to execute the subsequent command B. However, as noted above, the device driver 40 executes the command A' received from the application 10B and the command A" received from the application 10C earlier than the command B.

Thereafter, as shown in FIG. 9C, after the execution of the second command A' is completed, the device driver 40 executes the third command A" so as to control the one of the reader/writers 2. During the execution of the command A", the device driver 40 receives the command B from the application 10A and the command B' from the application 10B and places these commands in the execution wait mode. Subsequently, the device driver 40 sequentially executes the command B, the command B', and the command B" in the order in which these commands are received in the above-described manner.

Figure 10:
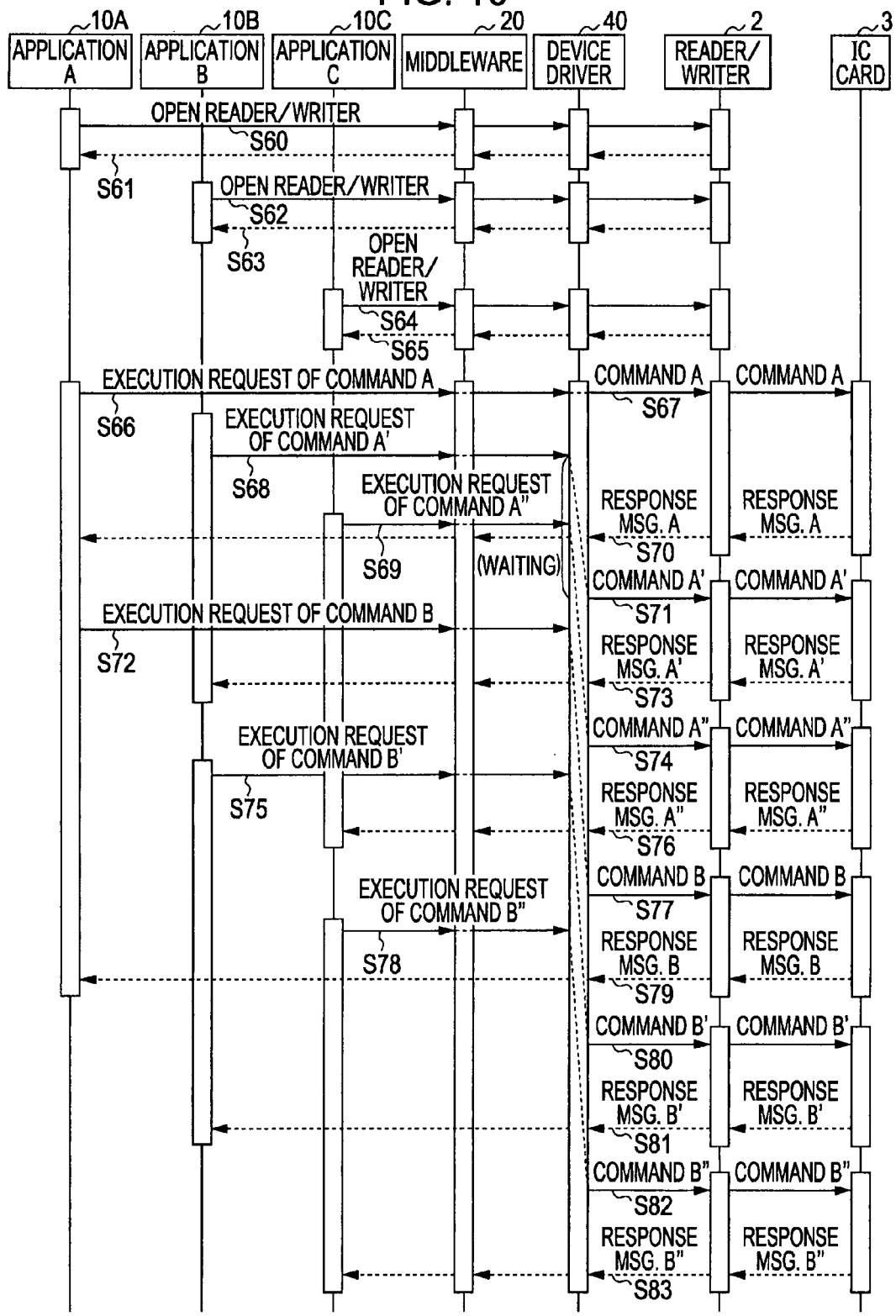
FIG. 10 is a sequence diagram illustrating a particular example of a command processing flow of the information processing apparatus according to the first embodiment.

The command execution sequence in the example illustrated in FIGS. 9A to 9C is described in more detail next with reference to FIG. 10. FIG. 10 is a sequence diagram illustrating a particular example of a command processing flow of the information processing apparatus 1 according to the present embodiment.

As shown in FIG. 10, upon receiving an open request from the application 10A, the middleware 20 and the device driver 40 execute the above-described steps illustrated in FIGS. 6 to 8 so as to open the corresponding one of the reader/writers 2 for the application 10A (steps S60 and S61). Similarly, the one of the reader/writers 2 is opened for the application 10B (steps S62 and S63), and the one of the reader/writers 2 is opened for the application 10C (steps S64 and S65). Thus, the applications 10A, 10B, and 10C can use the one of the reader/writers 2 so as to send commands to and receive response messages from the IC card 3 via the one of the reader/writers 2.

Subsequently, the application 10A sends an execution request of the command A to the device driver 40 via the middleware 20 (step S66). The device driver 40 immediately executes the command A and transmits the command A to the IC card 3 via the one of the reader/writers 2 (step S67). Thereafter, the device driver 40 receives a response message A in response to the command A from the IC card 3 via the one of the reader/writers 2 and outputs this response message A to the application 10A (step S70). During the execution of the command A (i.e., during a time period from step S67 to step S70), the application 10B sends an execution request of the command A' to the device driver 40 (step S68). Furthermore, the application 10C sends an execution request of the command A" to the device driver 40 (step S69). However, the device driver 40 places these commands A' and A" in the execution wait mode so as to put the applications 10B and 10C on standby. After the execution of the command A is completed (step S70), the device driver 40 executes the command A' so as to transmit this command to the IC card 3 (step S71). The device driver 40 then receives a response message A' in response to the command A' from the IC card 3 (step S73). Furthermore, after the execution of the command A' is completed (step S73), the device driver 40 executes the command A" (step S74) and receives a response message A" from the IC card 3 (step S76).

Similarly, the device driver 40 sequentially receives the execution requests of the commands B, B', and B" from the applications 10A, 10B, and 10C, respectively (steps S72, S75, and S78). At that time, the device driver 40 causes the applications 10A, 10B, and 10C to enter the standby mode until executions of the preceding commands A", B, and B' are completed (steps S76, S79, and S81). When executions of the preceding commands A", B, and B' are completed, the commands B, B', and B" are executed, respectively (steps S77, S80, and S82). When the device driver 40 receives a response message B" in response to the last received command B" and outputs the response message B" to the application 10C, the entire process is completed.

As described above, in the method for processing a command according to the present embodiment, the device driver 40 sequentially executes commands received from the applications 10 in the order in which the commands are received. In this way, the plurality of the applications 10 can concurrently use one of the reader/writers 2, and therefore, a multi-application environment can be appropriately provided.

However, some commands used for the IC card 3 change the state of the IC card 3 if the commands are executed after a specific command is executed. Accordingly, consider that one of the applications 10 opens one of the reader/writers 2 in the shared mode and executes a series of commands that need to be continuously executed. At that time, if a command from one of the applications 10 other than the one of the applications 10 interrupts the execution and that command is executed, the execution of the series of commands may fail. Thus, the one of the applications 10 operates in an unexpected manner.

For example, if the command A is a mutual authentication command between the application 10A and the IC card 3 and the command A' (e.g., a polling command or a read/write command) from the application 10B interrupts the execution of the command A, the authentication may be forcibly reset, although depending on the type of the command A'. In such a case, if the command B is designed so as to require the completion of the authentication process, the execution of the command B fails.

According to the present embodiment, as noted above, the middleware 20 provides the applications 10 with the API 22 used for acquiring and terminating an access right for one of the reader/writers 2. Furthermore, in response to the acquiring and terminating request of the access right, the device driver 40 can grant and withdraw the access right for accessing the one of the reader/writers 2 to and from the requester application 10. Thus, from the time when the requester application 10 receives the access right to the time when the requester application 10 terminates the access right (i.e., during a critical section), the device driver 40 can allow the execution of commands received from only the one of the applications 10 and inhibit the execution of commands received from the applications 10 other than the one of the applications 10.

Still furthermore, when one of the applications 10 gains the access right and the device driver 40 receives a command from one of the applications 10 other than the one of the applications 10, the device driver 40 places the command received from the one of applications 10 other than the one of the applications 10 in an execution wait mode from the time when the device driver 40 receives the command to the time when a predetermined access right waiting timeout is reached. When the predetermined access right waiting timeout is reached, the device driver 40 sends a timeout error message to the one of applications 10 other than the one of the applications 10.

Figure 11:
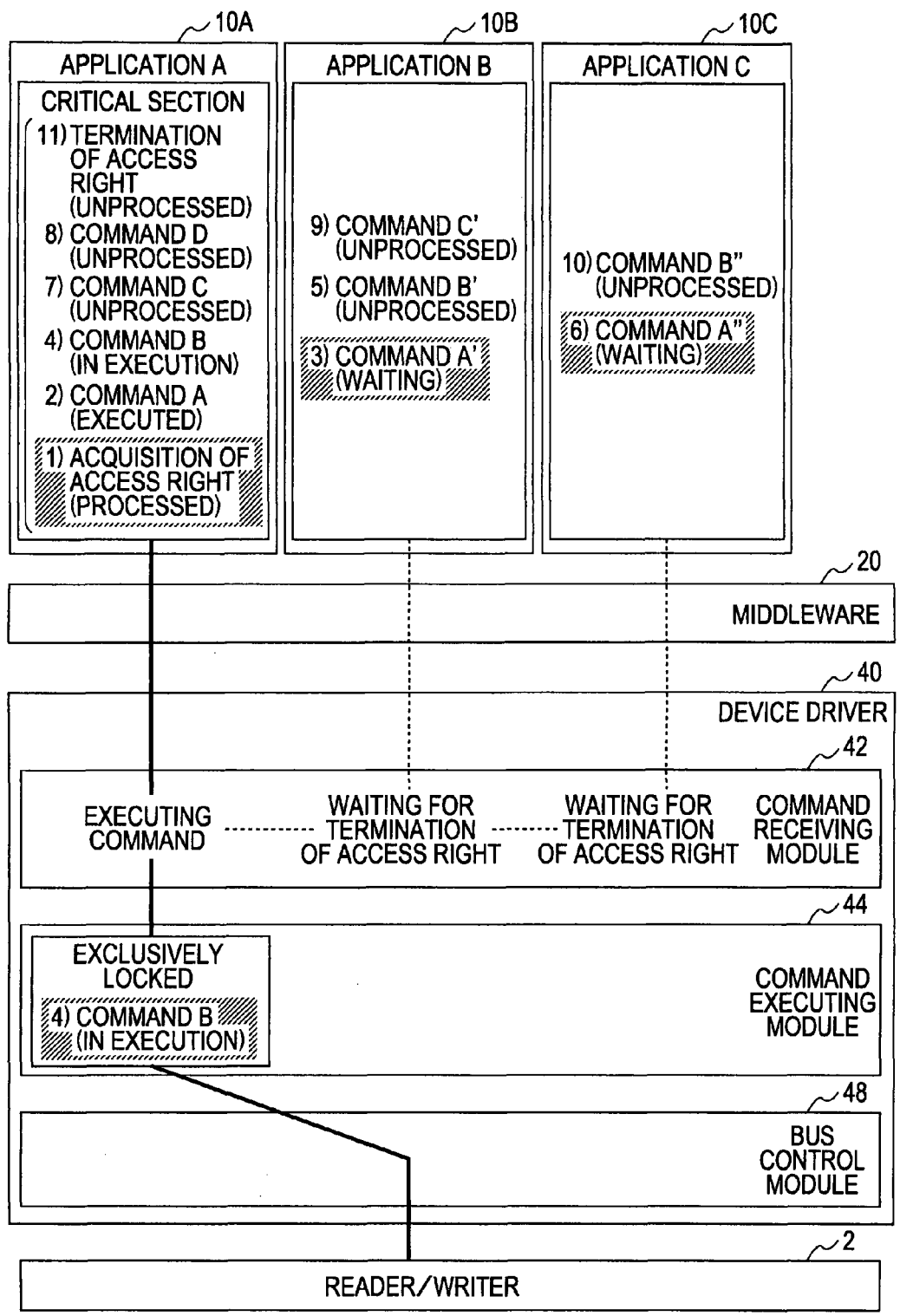
FIG. 11 is a schematic illustration of the processes of granting and withdrawing an access right to and from the application and the process of the access right waiting timeout according to the first embodiment.

The processes of granting and withdrawing the access right and the process of the access right waiting timeout are described in detail with reference to FIG. 11. FIG. 11 is a schematic illustration of the processes of granting and withdrawing the access right to and from one of the applications 10 and the process of the access right waiting timeout according to the present embodiment.

In an example shown in FIG. 11, three applications 10A, 10B, and 10C issue command execution requests to the device driver 40 in the following order: 1) an access-right acquisition command, 2) a command A, 3) a command A', 4) a command B, 5) a command B', and 6) a command A", 7) a command C, 8) a command D, 9) a command C', 10) a command B", and 11) an access right termination command. The commands A, B, C, and D form a series of commands that need to be executed continuously.

In this case, the application 10A outputs the command for acquiring an access right (the access-right acquisition command) to the device driver 40 before sending the first command-A execution request. In addition, the application 10A outputs the command for terminating the access right (the access-right termination command) to the device driver 40 after the execution of the last command D is completed. Upon receipt of the access-right acquisition request, the device driver 40 grants an access right to the application 10A. In contrast, upon receipt of the access-right termination request, device driver 40 withdraws an access right granted to the application 10A. The device driver 40 holds information about the access right granted to the application 10A, and therefore, the device driver 40 can distinguish the application 10A from the application 10B or 10C having no access right.

In this way, in a critical section from a time when the application 10A acquires the access right to a time when the application 10A terminates the access right, the device driver 40 can inhibit the execution of the commands sent from the applications 10B and 10C and allows only the series of commands A, B, C, and D sent from the application 10A to be executed continuously. In addition, after the access right is terminated, commands are executed in the order in which the commands are received. As a result, in the example shown in FIG. 11, the commands are executed in the following order: the command A, the command B, the command C, the command D, the command A', the command B', the command A", the command C', and the command B'.

Furthermore, in the example shown in FIG. 11, during execution of the command B received from the application 10A, the executions of the command A' received from the application 10B and the command A" received from the application 10C are placed in the access-right wait mode. At that time, the device driver 40 starts counting an elapsed time from the time the device driver 40 has received the execution requests of the command A' and A". If the access right waiting timeout specified by the application 10B or 10C is reached before the execution of the command B is completed, the device driver 40 sends an access-right waiting timeout error message to the application 10B or 10C. In this way, the device driver 40 can limit the waiting times of the applications 10B and 10C, thus preventing overload of the one of the reader/writers 2 caused by reception of too many command execution requests.

The command processing of granting and terminating the access right and the processing of the access right waiting timeout are described in more detail next with reference to FIG. 12. FIG. 12 is a sequence diagram illustrating a particular example of the command processing of granting and terminating the access right in the information processing apparatus 1 according to the present embodiment.

As shown in FIG. 12, like the example shown in FIG. 10, one of the reader/writers 2 is opened for the applications 10A, 10B, and 10C (steps S100 through S105).

Subsequently, the application 10A requests the device driver 40 to grant an access right to itself via the middleware 20. Thus, the application 10A acquires the access right (step S106). After the device driver 40 grants the access right to the application 10A, the device driver 40 cannot execute the commands received from the applications 10B and 10C. When the access right is granted to the application 10A or is terminated, the middleware 20 only functions as an interface between the device driver 40 and each of the applications 10A to 10C. When the API 22 is invoked by one of the applications 10, the middleware 20 outputs a command for acquiring or terminating the access right to the device driver 40. Upon receipt of the access right acquisition request or access right termination request, the device driver 40 determines whether it can grant or terminate the access right so as to grant or terminate the access right. The device driver 40 then sends the result of granting or terminating the access right to the application 10 via the middleware 20.

Subsequently, the application 10A having the granted access right sends the execution request of the series of the commands A, B, and C to the device driver 40 via the middleware 20 (steps S107, S111, and S115). The device driver 40 immediately executes these commands A, B, and C and transmits these commands A, B, and C to the IC card 3 via the one of the reader/writers 2 (steps S108, S112, and S116). Thereafter, the device driver 40 receives response messages A, B, and C from the IC card 3 via the one of the reader/writers 2 and outputs these response messages A, B, and C to the application 10A (steps S110, S114, and S118).

After the execution of the series of the commands A, B, and C is completed (step S118), the application 10A requests the device driver 40 to terminate the access right via the middleware 20. Thus, the access right is terminated (step S119).

After the access right is terminated, the device driver 40 can execute the commands sent from the applications 10B and 10C.

In the above-described critical section from a time when the application 10 acquires the access right to a time when the application 10 terminates the access right (steps S106 through S119), the application 10A has an exclusive access right. Accordingly, even when the application 10B sends the execution requests of the commands A' and C' to the device driver 40 (steps S109 and S117), the device driver 40 places the execution of the command A' and C' in an access-right wait mode and puts the application 10B on standby.

When the access right waiting timeout that is set for the application 10B and that is started when the command A' that is requested to be executed first is received (step S109) is reached (step S113), the above-described access right has not been terminated yet. Accordingly, the device driver 40 sends an access-right waiting timeout error on the command A' to the application 10B (step S113).

In contrast, when the access right waiting timeout that is set for the application 10B and that is started when the command C' that is requested to be executed next is received (step S117) is reached, the above-described access right has already been terminated (step S119). Accordingly, the device driver 40 executes the command C' so as to transmit the command C' to the IC card 3 via the one of the reader/writers 2 (step S120). Subsequently, the device driver 40 receives a response message C' for the command C' from the IC card 3 via the one of the reader/writers 2 and outputs the response message C' to the application 10B (step S121).

In addition, after the access right granted to the application 10A is terminated, the application 10C can acquire the access right for accessing the one of the reader/writers 2 (step S122). Thus, in a critical section from a time when the application 10C acquires the access right to a time when the application 10C terminates the access right (steps S122 through S128), the device driver 40 executes only the command D" received from the application 10C having the access right (steps S125 and S126) and places the command D received from the application 10A in an access-right wait mode (steps S123 through S127). Subsequently, when the access right waiting timeout that is set for the application 10A and that is started when the command D is received (step S123) is reached (step S127), the device driver 40 sends an access-right waiting timeout error on the command D to the application 10A (step S127).

As noted above, in the command processing according to the present embodiment, an exclusive access right to one of the reader/writers 2 is granted to one of the applications 10 when the one of the applications 10 requests the access right. Thus, command interruption performed by the applications 10 other than the one of the applications 10 can be inhibited, and therefore, the execution of a series of commands that need to be continuously executed can be reliably and successfully performed. Consequently, the one of the applications 10 can be reliably operated.

In addition, by providing the access right waiting timeout capability, the waiting time interval of one of the applications 10 can be limited to less than or equal to a predetermined time period when one of the applications 10 other than the one of the applications 10 holds the access right. Accordingly, too many processes requested from a plurality of the applications 10 are not concentrated on one of the reader/writers 2, and therefore, overload of the information processing apparatus 1 can be prevented. Furthermore, when one of the applications 10 receives an access-right waiting timeout error message, the one of the applications 10 can retry the execution of the same command or display that information on a monitor of the information processing apparatus 1.

So far, the information processing apparatus 1 and the method for mediating a plurality of the applications 10 for the IC card 3 in the information processing apparatus 1 according to the present embodiment have been described in detail. According to the present embodiment, the middleware 20 and the device driver 40 for the IC card 3 can suitably provide a multi-application environment. Therefore, even when a plurality of the applications 10 for the IC card 3 concurrently operate in the information processing apparatus 1 connected to one of the reader/writers 2 for the IC card 3 and, furthermore, a plurality of the applications 10 operate in the information processing apparatus 1 having a plurality of the reader/writers 2 connected thereto, the applications 10 can operate without any problem.

That is, since the device driver 40 sequentially processes command execution requests sent from a plurality of the applications 10, one of the reader/writers 2 can be used by the plurality of the applications 10 at the same time, and therefore, the functions of the plurality of the applications 10 can be effective at the same time. For example, when one of the applications 10 displays the balance information about electronic money and the shopping log information in the IC card 3, one of the applications 10 other than the one of the applications 10 can display information about a transit fare payment log in the IC card 3.

Furthermore, even when a plurality of the reader/writers 2 are connected to the information processing apparatus 1, the middleware 20 can appropriately allocate accesses from the applications 10 to the reader/writers 2. Thus, the data accesses are not concentrated to any one of the reader/writers 2, and therefore, processing efficiencies of the plurality of applications 10 that concurrently operate can be increased.

Still furthermore, the software used for accessing the IC card 3 has a three-tier structure, that is, the applications 10, the middleware 20, and the device driver 40. Accordingly, even when the structure of a command for the reader/writers 2 is modified, the middleware 20 and the device driver 40 can compensate for the change in the reader/writers 2. Consequently, the existing applications 10 can operate without any modifications.

Still furthermore, even when the IC card 3 including only the OS 32 and including no applications for the IC card 3 or the IC card 3 that does not allow predetermined IC card commands to be modified afterward is used, the information processing apparatus 1 can appropriately provide a multi-application environment.

While the present invention has been described with reference to exemplary embodiments, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, while the above-described exemplary embodiment has been described with reference to the information processing apparatus 1 having a plurality of the reader/writers 2 connected thereto, the present invention is not limited thereto. For example, only one of the reader/writers 2 may be connected to the information processing apparatus 1.

In addition, while the above-described exemplary embodiment has been described with reference to the noncontact IC card 3 and the reader/writers 2 communicating with the IC card 3 in a contactless manner, the present invention is not limited thereto. For example, the IC card 3 may be a contact IC card (e.g., a magnetic card), and the reader/writers 2 that read and write information from and to the IC card 3 in a contact manner may be employed. Furthermore, an information processing apparatus including the above-described capability of the IC card 3 may be embedded in a variety of units, such as mobile device (e.g., a cell phone) and a wrist watch. Alternatively, the information processing apparatus including the above-described capability of the IC card 3 may be attached to a variety of products, a sales promotion doll, accessories, and leaflets so that these products and goods may be used in place of the IC card 3. That is, these products and goods are within the scope of the IC cards according to the present invention.

The present document contains subject matter related to Japanese Patent Application JP 2006-104308 filed in the Japanese Patent Office on Apr. 5, 2006, the entire contents of which are incorporated by reference.

What is claimed is:

1. An information processing apparatus capable of being connected to an information processing device via a reader/writer, comprising:
  a processor; and
  a non-transitory memory, the memory storing instructions executable by the processor and providing:
    a middleware for providing a plurality of applications for the information processing device with basic functions shared by the applications, and
    a device driver for sequentially processing a plurality of commands received from the plurality of applications via the middleware in the order in which the commands are received by the device driver so as to control the corresponding reader/writer so that the applications concurrently access the reader/writer,
  wherein the device driver switches between a shared mode in which the plurality of applications are allowed to concurrently access the reader/writer and a dedicated mode in which only one of the applications is allowed to access the reader/writer, and
  wherein, upon receiving a command from one of the applications while executing a command received from one of the other applications the device driver:
    places the received command in an execution wait mode from the time when the command is received to the time when a predetermined timeout interval has elapsed, and
    sends a timeout error message to the one of the applications when the predetermined timeout interval has elapsed.

2. The information processing apparatus according to claim 1, wherein the middleware provides the applications with an application programming interface used for each of the applications to select one of the shared mode and the dedicated mode and wherein the device driver switches between the shared mode and the dedicated mode in accordance with the mode selected for each of the applications.

3. The information processing apparatus according to claim 1, wherein, when the shared mode is set, the device driver grants an access right to the reader/writer to one of the applications in response to a request received from the one of the applications, and wherein, while the access right is granted to the one of the applications, the device driver executes only commands received from the one of the applications and places commands received from the applications other than the one of the applications in an execution wait mode.

4. The information processing apparatus according to claim 3, wherein the middleware provides the one of the applications with an application programming interface used for the one of the applications to request the device driver to grant the access right to the one of the applications.

5. The information processing apparatus according to claim 1, wherein the device driver is capable of setting the timeout interval for each of the applications.

6. The information processing apparatus according to claim 1, wherein the device driver limits available number of applications concurrently accessible to the reader/writer to a predetermined maximum number of accesses or less.

7. The information processing apparatus according to claim 1, wherein the device driver includes a communication information storage module for storing information about communication between each of the applications and the reader/writer for each of the applications.

8. The information processing apparatus according to claim 1, wherein a plurality of reader/writers are connected to the information processing apparatus, and wherein the middleware selects one of the plurality of reader/writers in accordance with a use request received from each of the applications and requests the device driver corresponding to the selected reader/writer to set the selected reader/writer to be usable, and wherein the device driver determines whether the selected reader/writer is accessible from each of the applications in response to the request from the middleware, and wherein, if the selected reader/writer is accessible, the device driver sets the selected reader/writer to be usable with each of the applications.

9. The information processing apparatus according to claim 8, wherein the middleware holds a list of the one or more reader/writers compatible with each of the applications and sequentially selects one of the reader/writers in the list so as to sequentially request the device driver corresponding to the selected reader/writer to set the reader/writer to be usable with each of the applications.

10. A method of mediating a plurality of applications for an information processing device for use in an information processing apparatus capable of being connected to the information processing device via a reader/writer apparatus, the method comprising the steps of:
receiving, by the reader/writer apparatus, a plurality of commands by a device driver provided so as to correspond to the reader/writer apparatus from a middleware, the middleware providing the plurality of applications with basic functions shared by the applications so that the applications are concurrently accessible to the reader/writer apparatus; and
sequentially processing, by the reader/writer apparatus, the plurality of received commands by the device driver in the order in which the commands are received by the device driver so as to control the reader/writer apparatus;
wherein the device driver switches between a shared mode in which the plurality of applications are allowed to concurrently access the reader/writer apparatus and a dedicated mode in which only one of the applications is allowed to access the reader/writer apparatus, and
wherein, upon receiving a command from one of the applications while executing a command received from one of the other applications, the device driver:
places the received command in an execution wait mode from the time when the command is received to the time when a predetermined timeout interval has elapsed, and
sends a timeout error message to the one of the applications when the predetermined timeout interval has elapsed.

11. The method of mediating a plurality of applications according to claim 10, wherein the middleware provides the applications with an application programming interface used for each of the applications to select one of the shared mode and the dedicated mode and wherein the device driver switches between the shared mode and the dedicated mode in accordance with the mode selected for each of the applications.

12. The method of mediating a plurality of applications according to claim 10, wherein, when the shared mode is set, the device driver grants an access right to the reader/writer apparatus to one of the applications in response to a request received from the one of the applications, and wherein, while the access right is granted to the one of the applications, the device driver executes only commands received from the one of the applications and places commands received from the applications other than the one of the applications in an execution wait mode.

13. The method of mediating a plurality of applications according to claim 12, wherein the middleware provides the one of the applications with an application programming interface used for the one of the applications to request the device driver to grant the access right to the one of the applications.

14. The method of mediating a plurality of applications according to claim 10, wherein the device driver is capable of setting the timeout interval for each of the applications.

15. The method of mediating a plurality of applications according to claim 10, wherein the device driver limits available number of applications concurrently accessible to the reader/writer apparatus to a predetermined maximum number of accesses or less.

16. The method of mediating a plurality of applications according to claim 10, wherein the device driver includes a communication information storage module for storing information about communication between each of the applications and the reader/writer apparatus for each of the applications.

17. The method of mediating a plurality of applications according to claim 10, wherein a plurality of reader/writers apparatuses are connected to the information processing apparatus, and wherein the middleware selects one of the plurality of reader/writers apparatuses in accordance with a use request received from the application and requests the device driver corresponding to the selected reader/writer apparatus to set the selected reader/writer apparatus to be usable, and wherein the device driver determines whether the selected reader/writer apparatus is accessible from each of the applications in response to the request from the middleware, and wherein, if the selected reader/writer apparatus is accessible, the device driver sets the selected reader/writer to be usable.

18. The method of mediating a plurality of applications according to claim 17, wherein the middleware holds a list of the one or more reader/writers apparatuses compatible with each of the applications and sequentially selects one of the reader/writers apparatuses in the list so as to sequentially request the device driver corresponding to the selected reader/writer apparatus to set the reader/writer apparatus to be usable with each of the applications.

19. A computer program product comprising a non-transitory computer readable medium including program code stored thereon, the program code being executable to perform operations comprising:
causing a computer to function as an information processing apparatus capable of being connected to an information processing device via a reader/writer, the information processing apparatus including:
a middleware for providing a plurality of applications for the information processing device with basic functions shared by the applications, and
a device driver provided so as to correspond to the reader/writer, the device driver sequentially processing a plurality of commands received from the plurality of applications via the middleware in the order in which the commands are received by the device driver so as to control the corresponding reader/writer so that the applications concurrently access the reader/writer;
wherein the device driver switches between a shared mode in which the plurality of applications are allowed to concurrently access the reader/writer and a dedicated mode in which only one of the applications is allowed to access the reader/writer, and
wherein, upon receiving a command from one of the applications while executing a command received from one of the other applications the device driver:
places the received command in an execution wait mode from the time when the command is received to the time when a predetermined timeout interval has elapsed, and
sends a timeout error message to the one of the applications when the predetermined timeout interval has elapsed.

* * * * *